US012531226B2

(12) United States Patent
Perna et al.

(10) Patent No.: US 12,531,226 B2
(45) Date of Patent: Jan. 20, 2026

(54) APPARATUS FOR ELECTROSPRAY EMISSION

(71) Applicant: Accion Systems, Inc., Boston, MA (US)

(72) Inventors: Louis Perna, Boston, MA (US); Christy Petruczok, Boston, MA (US); Alexander Bost, Boston, MA (US)

(73) Assignee: Accion Systems, Inc., Boston, MA (US)

(*) Notice: Subject to any disclaimer, the term of this patent is extended or adjusted under 35 U.S.C. 154(b) by 460 days.

(21) Appl. No.: 18/070,174

(22) Filed: Nov. 28, 2022

(65) Prior Publication Data

US 2023/0112566 A1 Apr. 13, 2023

Related U.S. Application Data

(62) Division of application No. 16/879,540, filed on May 20, 2020, now Pat. No. 11,545,351.

(60) Provisional application No. 62/882,294, filed on Aug. 2, 2019, provisional application No. 62/850,907, filed on May 21, 2019.

(51) Int. Cl.
*H01J 49/16* (2006.01)
*B05B 5/025* (2006.01)
*B05B 5/053* (2006.01)

(52) U.S. Cl.
CPC .......... *H01J 49/167* (2013.01); *B05B 5/0255* (2013.01); *B05B 5/0533* (2013.01); *H01J 49/168* (2013.01)

(58) Field of Classification Search
CPC ..... H01J 49/167; H01J 49/168; B05B 5/0255; B05B 5/0533
See application file for complete search history.

(56) References Cited

U.S. PATENT DOCUMENTS

| | | | |
|---|---|---|---|
| 2,783,384 | A | 2/1957 | Bright et al. |
| 3,486,302 | A | 12/1969 | Paynter |
| 3,818,314 | A | 6/1974 | Miller et al. |
| 4,328,667 | A | 5/1982 | Valentian et al. |
| 4,471,289 | A | 9/1984 | Duley et al. |
| 4,733,530 | A | 3/1988 | Beattie et al. |
| 4,737,897 | A | 4/1988 | Shipley et al. |
| 4,739,461 | A | 4/1988 | Komatsu et al. |
| 4,855,604 | A | 8/1989 | Riahi |

(Continued)

FOREIGN PATENT DOCUMENTS

| | | | |
|---|---|---|---|
| CN | 109751214 | A | 5/2019 |
| EP | 2843789 | A2 | 3/2015 |

(Continued)

OTHER PUBLICATIONS

Legge Jr., Robert S., "Fabrication and Characterization of Porous Metal Emitters for Electrospray Applications", Brown University ( Mechanical Engineering) Department of Aeronautics and Astronautics, May 18, 2008, 140 pages (Year: 2008).*

(Continued)

*Primary Examiner* — David E Smith
(74) *Attorney, Agent, or Firm* — Jeffrey Schox; Randy Mehlenbacher

(57) ABSTRACT

An electrospray apparatus including a plurality of emitters, disposed on a substrate, wherein the plurality of emitters can have a narrow parameter distribution.

12 Claims, 12 Drawing Sheets

(56) References Cited

U.S. PATENT DOCUMENTS

| | | | |
|---|---|---|---|
| 5,018,634 | A | 5/1991 | Le |
| 5,279,323 | A | 1/1994 | Grove et al. |
| 5,416,364 | A | 5/1995 | Divjak |
| 5,624,875 | A | 4/1997 | Nakanishi et al. |
| 5,826,030 | A | 10/1998 | Hebert |
| 6,051,810 | A | 4/2000 | Stava |
| 6,055,169 | A | 4/2000 | Bowman et al. |
| 6,068,882 | A | 5/2000 | Ryu |
| 6,288,390 | B1 | 9/2001 | Siuzdak et al. |
| 6,297,499 | B1 | 10/2001 | Fenn |
| 6,707,035 | B2 | 3/2004 | Hughey et al. |
| 6,744,046 | B2 | 6/2004 | Valaskovic et al. |
| 6,768,119 | B2 | 7/2004 | De et al. |
| 6,826,030 | B2 | 11/2004 | Gorczyca et al. |
| 6,867,415 | B2 | 3/2005 | Hughey et al. |
| 7,015,046 | B2 | 3/2006 | Wohlstadter et al. |
| 7,097,781 | B2 | 8/2006 | Asakawa et al. |
| 7,129,513 | B2 | 10/2006 | Zhou et al. |
| 7,199,364 | B2 | 4/2007 | Thakur |
| 7,269,940 | B2 | 9/2007 | Wiseman |
| 7,335,897 | B2 | 2/2008 | Takats et al. |
| 7,385,798 | B2 | 6/2008 | Warren et al. |
| 7,397,032 | B2 | 7/2008 | Zona et al. |
| 7,517,479 | B2 | 4/2009 | Bango et al. |
| 7,696,489 | B2 | 4/2010 | Pilz et al. |
| 7,863,581 | B2 | 1/2011 | Lozano et al. |
| 7,932,492 | B2 | 4/2011 | Demmons et al. |
| 8,030,621 | B2 | 10/2011 | Lozano et al. |
| 8,063,336 | B2 | 11/2011 | Gefter et al. |
| 8,080,930 | B2 | 12/2011 | King |
| 8,084,735 | B2 | 12/2011 | Kertesz et al. |
| 8,198,106 | B2 | 6/2012 | Akinwande et al. |
| 8,207,496 | B2 | 6/2012 | Makarov et al. |
| 8,227,765 | B2 | 7/2012 | Syms |
| 8,272,345 | B2 | 9/2012 | Robertson et al. |
| 8,324,593 | B2 | 12/2012 | Lozano et al. |
| 8,368,295 | B2 | 2/2013 | Wei et al. |
| 8,394,877 | B2 | 3/2013 | Asakawa et al. |
| 8,448,419 | B2 | 5/2013 | Demmons et al. |
| 8,467,204 | B2 | 6/2013 | Agarwal et al. |
| 8,722,323 | B2 | 5/2014 | Wohlstadter et al. |
| 8,785,881 | B2 | 7/2014 | Lozano et al. |
| 8,791,411 | B2 | 7/2014 | Lozano et al. |
| 8,801,359 | B2 | 8/2014 | Sherrer |
| 8,850,792 | B2 | 10/2014 | Marrese-Reading et al. |
| 9,194,379 | B1 | 11/2015 | Biblarz et al. |
| 9,236,736 | B2 | 1/2016 | Oyobe et al. |
| 9,297,368 | B1 | 3/2016 | Patterson |
| 9,358,556 | B2 | 6/2016 | Velásquez-García et al. |
| 9,362,097 | B2 | 6/2016 | Lozano et al. |
| 9,460,884 | B2 | 10/2016 | Hopwood et al. |
| 9,478,403 | B2 | 10/2016 | Lozano et al. |
| 9,510,431 | B2 | 11/2016 | Oldynski et al. |
| 9,669,416 | B2 | 6/2017 | Velásquez-García et al. |
| 9,704,685 | B2 * | 7/2017 | Lozano .................. H01J 1/304 |
| 9,895,706 | B2 | 2/2018 | Velásquez-García et al. |
| 9,905,392 | B2 | 2/2018 | Lozano et al. |
| 10,125,052 | B2 | 11/2018 | Lozano et al. |
| 10,141,855 | B2 | 11/2018 | Fogel |
| 10,308,377 | B2 | 6/2019 | Lozano et al. |
| 10,312,820 | B2 | 6/2019 | Fogel |
| 11,342,173 | B2 | 5/2022 | Arnold |
| 11,356,027 | B2 | 6/2022 | Fogel et al. |
| 2004/0194305 | A1 | 10/2004 | Derochemont et al. |
| 2004/0226279 | A1 | 11/2004 | Fenn |
| 2005/0131163 | A1 | 6/2005 | Rhine et al. |
| 2005/0133372 | A1 | 6/2005 | Zhou et al. |
| 2005/0233085 | A1 | 10/2005 | Miller et al. |
| 2005/0269559 | A1 | 12/2005 | Zhou et al. |
| 2005/0281379 | A1 | 12/2005 | Qiu et al. |
| 2005/0287421 | A1 | 12/2005 | Simon et al. |
| 2006/0075739 | A1 | 4/2006 | Wiseman |
| 2006/0138997 | A1 | 6/2006 | Holmes et al. |
| 2007/0170056 | A1 | 7/2007 | Arnold et al. |
| 2007/0235647 | A1 | 10/2007 | Zona et al. |
| 2008/0011617 | A1 | 1/2008 | Struthers et al. |
| 2008/0051881 | A1 | 2/2008 | Feng et al. |
| 2008/0131615 | A1 | 6/2008 | Robertson et al. |
| 2008/0307766 | A1 | 12/2008 | Petras et al. |
| 2009/0032724 | A1 | 2/2009 | Lozano et al. |
| 2009/0058319 | A1 | 3/2009 | Berk et al. |
| 2009/0072750 | A1 | 3/2009 | Akinwande et al. |
| 2009/0113872 | A1 | 5/2009 | Demmons et al. |
| 2009/0114838 | A1 | 5/2009 | Lozano et al. |
| 2009/0130380 | A1 | 5/2009 | Asakawa et al. |
| 2009/0206660 | A1 | 8/2009 | Makita et al. |
| 2009/0224679 | A1 | 9/2009 | Pan et al. |
| 2009/0283824 | A1 | 11/2009 | Knight et al. |
| 2009/0309481 | A1 | 12/2009 | Chou et al. |
| 2010/0139823 | A1 | 6/2010 | Gash et al. |
| 2010/0201251 | A1 | 8/2010 | Park et al. |
| 2010/0209788 | A1 | 8/2010 | Yoon et al. |
| 2010/0284735 | A1 | 11/2010 | Sievers et al. |
| 2010/0289413 | A1 | 11/2010 | Eden et al. |
| 2011/0037102 | A1 | 2/2011 | Eden et al. |
| 2011/0079138 | A1 | 4/2011 | Storrie et al. |
| 2011/0079188 | A1 | 4/2011 | Meintschel et al. |
| 2011/0124116 | A1 | 5/2011 | Wohlstadter et al. |
| 2011/0126929 | A1 | 6/2011 | Velasquez-Garcia et al. |
| 2011/0150765 | A1 | 6/2011 | Boyden et al. |
| 2011/0210265 | A1 | 9/2011 | Lozano et al. |
| 2011/0217544 | A1 | 9/2011 | Young et al. |
| 2011/0284735 | A1 | 11/2011 | Van et al. |
| 2012/0024421 | A1 | 2/2012 | Boutet et al. |
| 2012/0037595 | A1 | 2/2012 | Asakawa et al. |
| 2012/0045863 | A1 | 2/2012 | Hopwood |
| 2012/0104554 | A1 | 5/2012 | Eden et al. |
| 2012/0119079 | A1 | 5/2012 | Ouyang et al. |
| 2012/0144796 | A1 | 6/2012 | Marrese-Reading et al. |
| 2012/0189836 | A1 | 7/2012 | Kruglick |
| 2012/0244291 | A1 | 9/2012 | Bisht et al. |
| 2012/0280141 | A1 | 11/2012 | Kovtoun et al. |
| 2012/0301981 | A1 | 11/2012 | Ozgur et al. |
| 2012/0304618 | A1 | 12/2012 | Roy |
| 2013/0083563 | A1 | 4/2013 | Wang et al. |
| 2013/0098774 | A1 * | 4/2013 | Lozano ..................... C25F 3/02 205/665 |
| 2013/0112675 | A1 | 5/2013 | Peters |
| 2013/0113370 | A1 | 5/2013 | Tabib-Azar |
| 2013/0228700 | A1 | 9/2013 | Lozano et al. |
| 2013/0241115 | A1 | 9/2013 | Core et al. |
| 2013/0256535 | A1 | 10/2013 | Meijer et al. |
| 2013/0319599 | A1 | 12/2013 | Huang |
| 2014/0054809 | A1 * | 2/2014 | Lozano .................. H01J 37/08 264/28 |
| 2014/0110661 | A1 | 4/2014 | Wang et al. |
| 2014/0284406 | A1 | 9/2014 | Brekenfeld et al. |
| 2014/0292180 | A1 | 10/2014 | Park et al. |
| 2014/0353397 | A1 | 12/2014 | Velasquez-Garcia et al. |
| 2014/0353860 | A1 | 12/2014 | Velasquez-Garcia et al. |
| 2015/0060757 | A1 | 3/2015 | Lee et al. |
| 2015/0061487 | A1 | 3/2015 | Sharifi et al. |
| 2015/0061612 | A1 | 3/2015 | Bernoux et al. |
| 2015/0170865 | A1 | 6/2015 | Lozano et al. |
| 2015/0255241 | A1 | 9/2015 | Bonam |
| 2016/0096185 | A1 | 4/2016 | Nobuo et al. |
| 2016/0107178 | A1 * | 4/2016 | Velásquez-García ..... B05B 1/14 239/3 |
| 2016/0111242 | A1 | 4/2016 | Lozano et al. |
| 2016/0297549 | A1 | 10/2016 | Lozano et al. |
| 2016/0318048 | A1 | 11/2016 | Velásquez-García et al. |
| 2016/0376150 | A1 | 12/2016 | Lozano et al. |
| 2017/0110284 | A1 | 4/2017 | Lozano et al. |
| 2017/0369753 | A1 | 12/2017 | Demmons et al. |
| 2018/0076003 | A1 | 3/2018 | Lozano et al. |
| 2018/0201395 | A1 | 7/2018 | Jung-Kubiak et al. |
| 2019/0378704 | A1 | 12/2019 | Bachus et al. |
| 2021/0261275 | A1 | 8/2021 | Osuga et al. |
| 2021/0299684 | A1 | 9/2021 | Kaanta et al. |
| 2021/0300599 | A1 * | 9/2021 | Buldrini .................. F03H 1/005 |
| 2022/0090587 | A1 | 3/2022 | Perna et al. |

(56) References Cited

U.S. PATENT DOCUMENTS

FOREIGN PATENT DOCUMENTS

| | | | | |
|---|---|---|---|---|
| WO | 9928624 A1 | | 6/1999 | |
| WO | 02055990 A2 | | 7/2002 | |
| WO | 2006009854 A2 | | 1/2006 | |
| WO | 2007002170 A2 | | 1/2007 | |
| WO | 2009023257 A1 | | 2/2009 | |
| WO | 2009039338 A1 | | 3/2009 | |
| WO | 2009137583 A2 | | 11/2009 | |
| WO | 2011079138 A2 | | 6/2011 | |
| WO | 2012078043 A1 | | 6/2012 | |
| WO | 2013016497 A2 | | 1/2013 | |
| WO | WO-2013003795 A1 | * | 1/2013 | ............ H01J 49/167 |
| WO | 2017093906 A1 | | 6/2017 | |

OTHER PUBLICATIONS

Bost, Alexander, "Materials for Small-Scale Space Propulsion Systems", Abstract of Thesis, Masschusetts Institute of Technology, Department of Aeronautics and Astronautics, 2017, https://dspace.mit.edu/handle/1721.1/112412 (Year: 2017).*

Bost, Alexander, "Materials for Small-Scale Space Propulsion Systems", Abstract of Thesis, Massachusetts Institute of Technology, Department of Aeronautics and Astronautics, 2017 (Year: 2017).*

"Common Metal Mesh Configurations, Dutch Weaves", Sefar North America 2009.

"Miriam Webster Dictionary definition of Mode", https://www.merriam-webster.com/dictionary/modal (Year: 2022), retrieved Mar. 28, 2022.

"Miriam Webster Dictionary Definition of Unimodal", https://www.merriam-webster.com/dictionary/unimodal (Year: 2022), retrieved Mar. 28, 2022.

Arestie, Steven Mark, "Porous Material and Process Development for Electrospray Propulsion Applications", Thesis submitted to the Department of Aeronautics and Astronautics, Massachusetts Institute of Technology, Jun. 2014.

Baxandall, P.J. , "Transistor Sine-Wave LC Oscillators—Some General Considerations and New Developments", The Institute of Electrical Engineers, Paper No. 2978 E, Feb. 1960, 11 pages.

Bennett, Michael , "Spinning a yarn, nano-style—more affordable fibres", Materials World Magazine. The Institute of Materials, Minerals and Mining. Jan. 7, 2013. 2 pages. www.iom3.org/news/spinning-yam-nano-style-affordable-fibres> Last accessed Jun. 5, 2013.

Bost, Alexander Conner Larkin , "Materials for Small-Scale Space Propulsion Systems", Submitted to the Department of Aeronautics and Astronautics at the Massachusetts Institute of Technology, Jun. 2017, 92 pages.

Bruno, Amelia R., et al., "Design and Testing of a Propellant Management System for Bimodal Chemical-Electrospray Propulsion", 2021 IEEE.

Burger, Christian , et al., "Nanofibrous Materials and Their Applications", Annu. Rev. Mater. Res., No. 36 pp. 333-368, 2006.

Carretero, Jorge A., et al., "Numerical Simulation of Taylor Cone-Jets and Colloid Thruster Plumes", 4th International Conference on Spacecraft Proprulsion, Cagliari, Italy. Jun. 2-4, 2004.

Chang, Chieh , et al., "Continuous near-field electrospinning for large area deposition of orderly nanofiber patterns", Appl. Phys. Lett. 93:123111 (2008).

Chato, David J., et al., "Vented Tank Resupply Experiment: Flight Test Results", Journal of Spacecraft and Rockets, vol. 43, No. 5, Sep.-Oct. 2006.

Chiu, Yu-Hui , et al., "Mass Spectrometric Analysis of Colloid Thruster Ion Emission from Selected Propellants", Journal of Propulsion and Power. 2005. 21(3):416-23.

Clampitt,, R. , et al., "Intense field-emission ion source of liquid metals", J of Vaccum Science and Technology. 1975. 12 (1):1208.

Cleaver , et al., "A 100-kV ion probe microfabrication system with a tetrode gun", Vacuum Sci and Technol. 1981. 19(4): 1145-8.

Coffman, Chase Spenser, "Considerations for a Multi-Modal Electrospray Propulsion System", Thesis submitted to the Department of Aeronautics and Astronautics on Aug. 23, 2012.

Collard, Timothy A., et al., "Pressurized Xenon Propellant Management System for the CubeSat Ambipolar Thruster", Joint Conference of the 30th International Symposium on Space Technology and Science, 34th International Electric Propulsion Conference and the 6th Nano-satelite Symposium, Hyogo-Kobe, Japan, Jul. 4-10, 2015.

De La Mora, Juan Fernandez, et al., "The Current Emitted by Highly Conductive Taylor Cones", J Fluid Mech. , vol. 260, pp. 155-184, 1994.

De La Mora, Juan Fernandez, "The Fluid Dynamics of Taylor Cones", Annual Review of Fluid Mechanics, vol. 39: pp. 217-243 (2007).

De Saavedra, F. De Borja , et al., "Direct thrust measurements of an externally wetted electrospray thruster", Presented at the 37th International Electric Propulsion Conference, Massachusetts Institute of Technology, Cambridge, MA, USA, Jun. 19-23, 2022.

Deitzel, J.M , et al., "Controlled deposition of electrospun poly( ethylene oxide) fibers", Polymer No. 42 pp. 8163-8170, 2001.

Despois, Jean-François , et al., "Permeability of open-pore microcellular materials", Acta Materialia. Elsevier, Oxford, GB. Mar. 2005. 53(5): 1381-8.

Doshi, Jayesh , et al., "Electrospinning Process and Applications of Electrospun Fibers", J Electrost. No. 35, pp. 151-160, 1995.

Driese, W. , "In situ observation of the tip shape of AuGe liquid alloy ion sources using a high voltage transmission electron microscope", J. Vac. Sci. Technol. B. 1996. 14(5):3367-80.

Escher, Conrad , "Vaccuum Ion Emission From Solid Electrolytes: An Alternative Source for Focused Ion Beams", Applied Physics Letters. 2006. 89: 053513-1 and 053513-2.

Freeman, Dakota S., "Design and Manufacture of the Next Generation of Ion Electrospray Thrusters", Thesis submitted to the Department of Aeronautics and Astronautics, Massachusetts Institute of Technology, Jun. 2019.

Gassend, Blaise , "A Microfabricated Planar Electrospray Array Ionic Liquid Ion Source With Integrated Extractor", Journal of Microelectromechanical Systems , vol. 18, No. 3, pp. 679-694, 2009.

Gassend, Blaise , "Precision In-Plane Hand Assembly of Bulk-Microfabricated Components for High-Voltage MEMS Arrays Applications", J of Microelectromechanical Systems, vol. 18, No. 2, pp. 332-326 (2009).

Gibson, Phillip , et al., "Transport properties of porous membranes based on electrospun nanofibers", Colloids and Surfaces A: Physicochemical and Engineering Aspects, No. 187-188, pp. 469-481 (2001).

Gleb, Lev D., et al., "Pore Size Distributions in Porous Glasses: A Computer Simulation Study", Langmuir 1999, 15, 305-308.

Guharay, S. K., "Characteristics of focused beam spots using negative ion beams from a compact surface plasma source and merits for new applications", Journal of Vacuum Science and Technology B. 1998. 16(6): 3370-3.

Guzdar, P. N. , et al., "Charging of substrates irradiated by particle beams", Applied Physics Letters. 1997. 71(22). 3302-4.

Hansen, Klavs , et al., "Electric Field Enhancement Factors Around a Metallic, End-Capped Cylinder", Nano Brief Reports and Reviews, Jan. 2012.

Hardesty, Larry , "Making 'nanospinning' practical", MIT News Office; https://news.mit.edu/2012/making-nanospinning-practical-1120; Nov. 20, 2012.

Hartwig, Jason W., "Propellant Management Devices for Low-Gravity Fluid Management: Past, Present, and Future Applications", Journal of Spacecraft and Rockets, vol. 54, No. 4, Jul.-Aug. 2017.

He , et al., "Magnetic and photomagnetic properties of polycrystalline wide-gap semiconductor Cd1—xMnxTe thin films", Journal of Electronic Materials. Feb. 1997. 26(2):73-7.

Hemberger, Frank , "Thermal transport properties of functionally graded carbon aerogels", Int J Thermophys. 2009;30:1357-71.

Hill, Frances Ann, "High-Throughput Ionic Liquid Ion Sources Using Arrays of Microfabricated Electrospray Emitters With Integrated Extractor Grid and Carbon Nanotube Flow Control Struc-

(56) References Cited

OTHER PUBLICATIONS tures", Technical Digest of the 17th International Conference on Solid-State Sensors Actuators, and Microsystems. Barcelona, Spain. Jun. 16-20, 2013.
Hruby, Vlad , et al., "Micro Newton Colloid Thruster System Development", Electric Rocket Propulsion Society, 2001.
Inayat, Alexandra , et al., "Recent advances in the synthesis of hierarchically porous silica materials on the basis of porous glasses", New J. Chem., 2016, 40, 4095-4114.
Ishino, Chieko , "Wicking within forests of micropillars", EPL (Europhysics Letters) 79(5):56005, Aug. 2007.
Jain, Himanshu , "Glass Processing", Lecture #26, Porous Glass, IMI-NFG's Glass Processing course, Spring 2015.
Kobayashi, Keita , et al., "Growth of large-diameter (~4 nm) single-wall carbon nanotubes in the nanospace of mesoporous material SBA-15", Carbon, vol. 49, Issue 15, Dec. 2011, pp. 5173-5179.
Kristinsson, Bjarni Orn, "On the Design of Electrospray Emitters and their Microfluidic Behavior", Thesis submitted to the Department of Aeronautics and Astronautics, Massachusetts Institute of Technology, Jun. 2019.
Krpoun, R. , et al., "Tailoring the hydraulic impedance of out-of-plane micromachined electrospray sources with integrated electrodes", Appl. Phys. Lett., vol. 94, 2009.
Larriba , et al., "Monoenergetic Source of Kilodalton Ions from Taylor Cones of Ionic Liquids", Journal of Applied Physics. 2007. 101: 084303-1 to 084303-6.
Larrondo , et al., "Electrostatic fiber spinning from polymer melts &mdash", 1. Experimental-observations on fiber formation and properties, J Polym. Sci. B 1No. 9, pp. 909-920 (1981).
Larsen, Gustavo , et al., "Use of Coaxial Gas Jackets to Stabilize Taylor Cones of Volatile Solutions and to Induce Particle-to-Fiber Transitions", Adv Mater vol. 16, No. 2, 166-169, (2004).
Lee, Seungsin , et al., "Developing Protective Textile Materials as Barriers to Liquid Penetration Using Melt-Electrospinning", Journal of Applied Polymer Science, vol. 102, pp. 3430-3437, (2006).
Legge, Robert S., et al., "Electrospray Propulsion Based on Emitters Microfabricated in Porous Metals", Journal of Propulsion and Power, vol. 27, No. 2, Mar.-Apr. 2011, pp. 485-494.
Yamashita, Yoshihiro , et al., "Characteristics of Elastomeric Nanofiber Membranes", Journal of Textile Engineering, vol. 53, No. 4, (2007). 10 pages.
Yang, Ying , et al., "Multiple Jets in Electrospinning", Proceedings of the 8th International conference on properties and applications of dielectric materials, pp. 940-943 (2006).
Yang, Bao-Jun , et al., "Research Progress in Preparation and Application of Gradient-P0rous Metal", Apr. 2008, vol. No. 2, Powder Metallurgy Industry.
Yarin, A. L., et al., "Upward needleless electrospinning of multiple nanofibers", Polymer 45 (2004) 2977-2980.
Zeng, H. , et al., "Influence of Property Gradient on the Behavior of Cellular Materials Subjected to Impact Loading", AIP Conference Proceedings. AIP USA. Feb. 15, 2008. vol. 18.
Zhou, Weiping , et al., "Gas Flow-Assisted Alignment of Super Long Electrospun Nanofibers", Journal of Nanoscience and Nanotechnology, vol. 7, 2667-2673, 2007.
Zhou, Feng-Lei , et al., "Mass production of nanofibre assemblies by electrostatic spinning", Polym Int, No. 58, pp. 331-342 (2009).
Zong, Xinhua , et al., "Control of structure, morphology and property in electrospun poly(glycolide-co-lactide) non-woven membranes via post-draw treatments", Polymer 44 (2003) 4959-4967.
Legge, Robert S., et al., "Fabrication and Characterization of Porous Metal Emitters for Electrospray Applications", Brown University (Mechanical Engineering): Department of Aeronautics and Astronautics. May 18, 2008. 140 pages.
Legge, Robert , et al., "Fabrication and Characterization of Porous Metal Emitters for Electrospray Thrusters", IEPC-2007-145 Proc. 30th International Electric Proulsion Conference, Florence, Italy, Sep. 17-20, 2007.
Li , et al., "Electrospinning of nanofibers: reinventing the wheel", Advanced Materials, vol. 16, pp. 1151-1170, 2004.
Li, Jian , "The Focused-Ion-Beam Microscope—More than a Precision Ion Milling Machine", JOM. 2006. 58 (3): 27-31.
Lin, Yi , et al., "Preparation of poly(ether sulfone) nanofibers by gas-jet/electrospinning", vol. 107, pp. 909-917, 2008.
Lozano, Paulo , "Electrospray emission from nonwetting flat dielectric surfaces", Journal of Colloid and Interface Science. 2004. 276(2): 392-9.
Lozano, Paulo , "Experimental Measurements of Colloid Thruster Plumes in the Ion-Droplet Mixed Regime", (AIAA-3814) 38th Joint Propulsion Conference. Indianapolis, Indiana. Jul. 7-10, 2002. 1-6.
Lozano, Paulo C, et al., "Experimental Measurements of Colloid Thruster Plumes in the Ion-Droplet Mixed Regime", 38th AIAA/ASME/SAE/ASEE Joint Propulsion Conference & Exhibit Jul. 7-10, 2022, Indianapolis, Indiana.
Lozano, Paulo , et al., "Ionic liquid ion sources: characterization of externally wetted emitters", J. Colloid Interf. Sci., vol. 282, pp. 415-421, 2005.
Lozano, Paulo , "Ionic liquid ion sources: suppression of electrochemical reactions using voltage alternation", J. Colloid Interf. Sci. 2004. vol. 280, pp. 149-154.
Lozano, Paulo , "On the dynamic response of externally wetted ionic liquid ion sources", J. Phys. D.: Appl Phys. 2005. 38(14). 2371-7.
Lozano, Paulo , et al., "Performance Characteristics of a Linear Ionic Liquid Electrospray Thruster", IEPC-2005-192. 29th International Electric Propulsion Conference. Princeton University (USA). Oct. 21-Nov. 2005.
Lukas, David , et al., "Self-organization of jets in electrospinning from free liquid surface: A generalized approach", Appl. Phys. 103, 084309 (2008).
Ma, Chengyu , et al., "The Design and Characterization of a Porous-emitter Electrospray Thruster (PET-100) for Interplay CubeSats", Proceedings of iCubeSat 2018, the 7th Interplanetary CubeSat Workshop, Paris, France, May 25, 2018.
Mcewen, Alan , et al., "Electrochemical Properties of Imidazolium Salt Electrolytes for Electrochemical Capacitor Applications", Journal of The Electrochemical Society, 146 (5) 1687-1695 (1999).
Mitterauer, J. , "Liquid Metal lon Sources as Thrusters for Electric Space Propulsion", Journal de Physique Colloques, 1987, 48 (C6), pp. C6-171-C6-176.
Mühle, R , "A time-of-flight spectrometer for investigations on liquid metal ion sources", J. Phys. D: Appl Physucs, 1999. 32(2): 161-7.
Paruchuri, Srinivas , et al., "Splitting of a Liquid Jet", Phys. Rev. Lett. vol. 98:134502, 2007.
Petrik, Stanislav , et al., "Production Nozzle-Less Electrospinning Nanofiber Technology", Mater. Res. Soc. Symp. Proc. vol. 1240, 2010 Material Research Society, 1240-W-W03-07.
Ponce De Leon, P.J. , et al., "Batch-Microfabricated Arrays of Electrospinning Emitters for High Throughput Generation of Nanofibers", Technical Digest of the 12th International Workshop on Micro and Nanotechnology for Power Generation and Energy Conversion Applications. Atlanta GA, USA. pp. 227-230, Dec. 2-5, 2012.
Prewett, P.D. , "Focused Ion Beams from Liquid Metal Ion Sources", Book, Publisher Research Studies Press. 1991. 19-30, 78-101 and 151-74.
Quéré, David , "Wetting and Roughness", Annu. Rev. Mater. Res. 2008;38:71-99.
Reneker, Darrell H., et al., "Electrospinning jets and polymer nanofibers", Polymer, vol. 49, pp. 2387-2425, 2008.
Romero-Sanz, I. , et al., "Source of heavy molecular ions based on Taylor cones of ionic liquids operating in the pure ion evaporation regime", J. Appl. Phys., vol. 94, pp. 3599-3605, 2003.
Scipioni, L. , et al., "Performance of multicusp plasma ion source for focused ion beam applications", Journal of Vacuum Science and Technology B. 2000. 18(6). 3194-7.
Seiwert, Jacopo , et al., "Coating of a textured solid", J. Fluid Mech. 669 55 (2011).

(56) References Cited

OTHER PUBLICATIONS

Smith, Noel , et al., "High Brightness Inductively Coupled Plasma Source for High Current Focused Ion Beam Applications", Journal of Vacuum Science and Technology B.2006. 24(6): 2902-6.
Srinivasan, Gokul , et al., "Structure and Morphology of Small Diameter Electrospun Aramid Fibers", Polymer International, No. 36, pp. 195-201, 1995.
Srivastava, Yasmin , "Multijet electrospinning of conducting nanofibers from microfluidic manifolds", J Appl. Polymer Sci. vol. 106 pp. 3171-3178, 2007.
Suzuki , et al., "Contrast Differenes Between Scanning ION and Scanning Electron Microscope Images", Journal Vacuum Science and Technology A. 2004. 22(1): 49-52.
Swanson , et al., "Emission Characteristics of Fallium and Bismuth Liquid Metal Ion Sources", J. Vac. Sci. Technol. 1979. 16(6): 1864-9.
Szilagyi, Miklos , "Electron and Ion Optics", Plenum Press. 1988. 216-50 and 251-63.
Taylor, Geoffrey Ingram, et al., "Disintegration of Water Drops in an Electric Field", Proc. R. Soc. London A 280 (1964) 383-397.
Teo, K. B. K., et al., "Uniform patterned growth of carbon nanotubes without surface carbon", Appl. Phys. Lett., vol. 79, pp. 1534-1536 (2001).
Thavasi, V. , et al., "Electrospun nanofibers in energy and environmental applications", Energy Environ. Sci., 2008, 1, 205-221.
Theron, S. A., et al., "Multiple jets in electrospinning: experiment and modeling", Polymer 46 2889-2899 (2005).
Timilsina, Navin , "Electrospray Thrusters for Attitude Control of a 1-U CubeSat", University of California, Irvine, Thesis, 2014.
Tomaszewski, Wacław , et al., "Investigation of Electrospinning with the Use of a Multi-jet Electrospinning Head", Fibres & Textiles in Eastern Europe, vol. 13, pp. 22-26, 2005.
Tseng, Ampere A., "Recent Developments in Nanofabrication Using Focused Ion Beams", Small. 2005. 1 (10):924-39.
Vaseashta, A. , "Controlled formation of multiple Taylor cones in electrospinning process", Applied Physics Letters, vol. 90, No. 9, 093115 (2007).
Velásquez-García, Luis Fernando, "A Micro-Fabricated Linear Array of Electrospray Emitters for Thruster Applications", Journal of Microelectromechanical Systems, vol. 15, No. 5, Oct. 2006, pp. 1260-1271.
Velásquez-García, Luis Fernando, "A Planar Array of Micro-Fabricated Electrospray Emitters for Thruster Applications Luis", J. of Microelectromechanical Systems, vol. 15, No. 5, pp. 1272-1280 (2006).
Velásquez-García, Luis F., "An Application of 3-D MEMS Packaging: Out-of-Plane Quadrupole Mass Filters", Journal of Microelectromechanical Systems, vol. 16, No. 6, pp. 1430-1438 (2008).
Velásquez-García, Luis Fernando, "CNT-Based MEMS/NEMS Gas Ionizers for Portable Mass Spectrometry Applications", Journal of Microelectromechanical Systems, vol. 19,No. 3,pp. 484-493 (2010).
Velásquez-García, Luis , "Fabrication of large arrays of high-aspect-ratio single-crystal silicon columns with isolated vertically aligned multi-walled carbon nanotube tips", Nanotechnology. Oct. 8, 2008;19(40): 405305(1-6). doi:10.1088/0957 4484/19/40/405305.
Velásquez-García, Luis Fernando, et al., "Precision Hand Assembly of MEMS Subsystems Using DRIE-Patterned Deflection Spring Structures: An Example of an Out-of-Plane Substrate Assembly", J of Microelectromechanical Systems, vol. 16, No. 3, pp. 598-612, Jun. 2007.
Velásquez-García, Luis Fernando, "SLA 3-D Printed Arrays of Miniaturized, Internally Fed, Polymer Electrospray Emitters", Journal of Microelectromechanical Systems, vol. 24, No. 6, Dec. 2015; 24(6):2117-2127, doi: 10.1109/JMEMS.2015.2475696.
Xiao, Rong , et al., "Prediction and Optimization of Liquid Propagation in Micropillar Arrays", Langmuir 26 15070-15075 (2010).
Xie, Julie , "Fabrication and Characterization of Sintered Porous Glass Emitters for Electrospray Propulsion", Thesis submitted to the Department of Aeronautics and Astronautics, Massachusetts Institute of Technology, Jun. 2014.
Rojas-Herrera, Jimmy , et al., Porous Materials for Ion-Electrospray Spacecraft Microengines.
Legge, Robert , "Final Project: Finite Element Modelling of Ionic Liquid Flow Through Porous Electrospray Emitters", May 14, 2008.
Lozano, Paulo C., "Energy properties of an EMI-Im ionic liquid ion source", J. Phys. D: Appl. Phys. 39 (2006) 126-134, published Dec. 15, 2005.

* cited by examiner

APPARATUS FOR ELECTROSPRAY EMISSION

CROSS-REFERENCE TO RELATED APPLICATIONS

This application is a divisional of U.S. patent application Ser. No. 16/879,540, filed 20 May 2020, which claims the benefit of U.S. Provisional Application No. 62/850,907 filed 21 May 2019, and U.S. Provisional Application No. 62/882,294 filed 2 Aug. 2019, each of which is incorporated in its entirety by this reference.

TECHNICAL FIELD

This invention relates generally to the electrospray emission field, and more specifically to a new and useful apparatus in the electrospray emission field.

BACKGROUND

Electrospray emitters have potential benefits for spacecraft propulsion. However, current electrospray emitters suffer from short lifetimes, off-axis emission, poor stability, electrical current limitations, impulse throughput, and/or other limitations. Thus, there is a need in the electrospray emission field for a new and useful apparatus for emitting ions. This invention provides such a new and useful apparatus.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
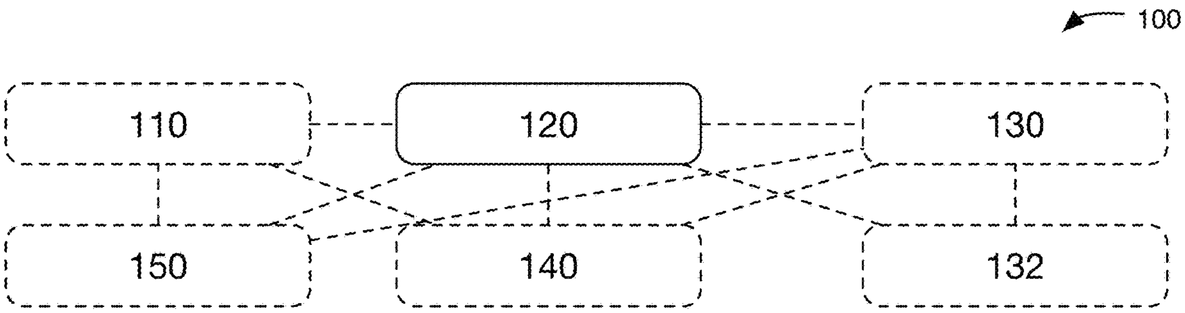
FIG. 1 is a schematic representation of the apparatus.

The apparatus 100, as shown in FIG. 1, for electrospray emission preferably includes one or more emitter arrays. The apparatus can optionally include one or more control systems, one or more reservoirs, one or more working materials, one or more counter electrodes, one or more power supplies, and/or any other suitable elements.

In variants including more than one emitter array, the constituent emitter arrays can be the same (e.g., have the same emitter height, have the same aspect ratio, distribution, material, array size, shape, etc.) or different (e.g., have different emitter height, have different aspect ratios, distribution, material, array size, shape, etc.).

Figure 2:
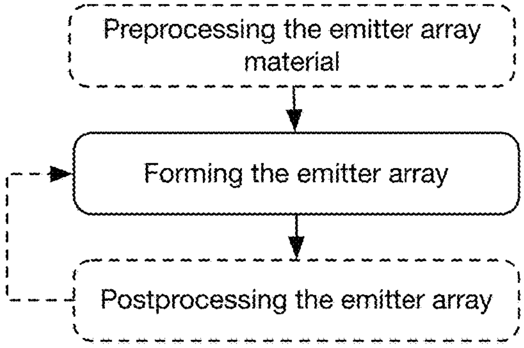
FIG. 2 is a schematic representation of the method of manufacture.

The method of manufacture, as shown in FIG. 2, preferably includes forming the emitter array and postprocessing the emitter array; however, the method of manufacture can include any other suitable process.

The apparatus for electrospray emission is preferably integrated into an ion propulsion system 105. The apparatus 100 preferably functions to propel mass in a microgravity/zero gravity environment. Alternatively, in variation, the apparatus can be used in biomedical fields (e.g., injection needles), electrospray (e.g., as an ion beam source for microscopy, spectroscopy, etc.), to induce wetting behavior, electrospinning, ion beam etching, ion beam deposition, ion beam implantation, and/or in any other suitable field.

2. Benefits.

The apparatus can confer many benefits over existing electrospray emission apparatuses.

Figure 8A:
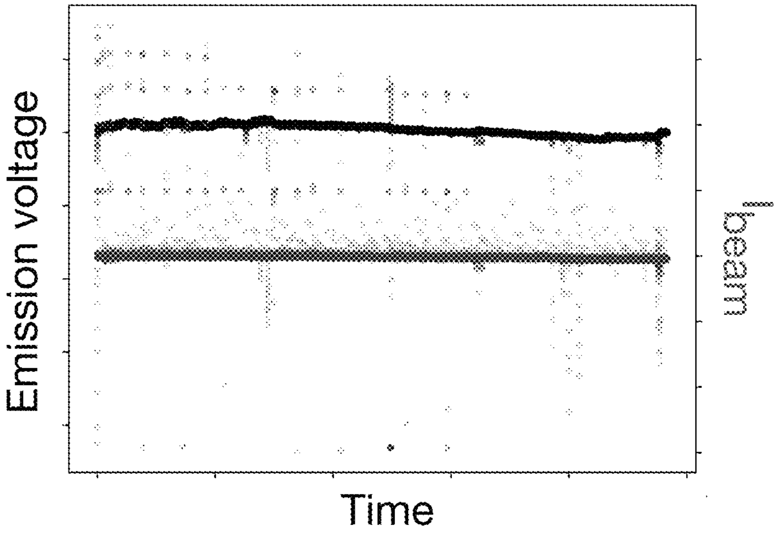
FIGS. 8A, 8B, and 8C show representative data for the lifetime of an embodiment of the apparatus for electrospray emission.
Figure 8B:
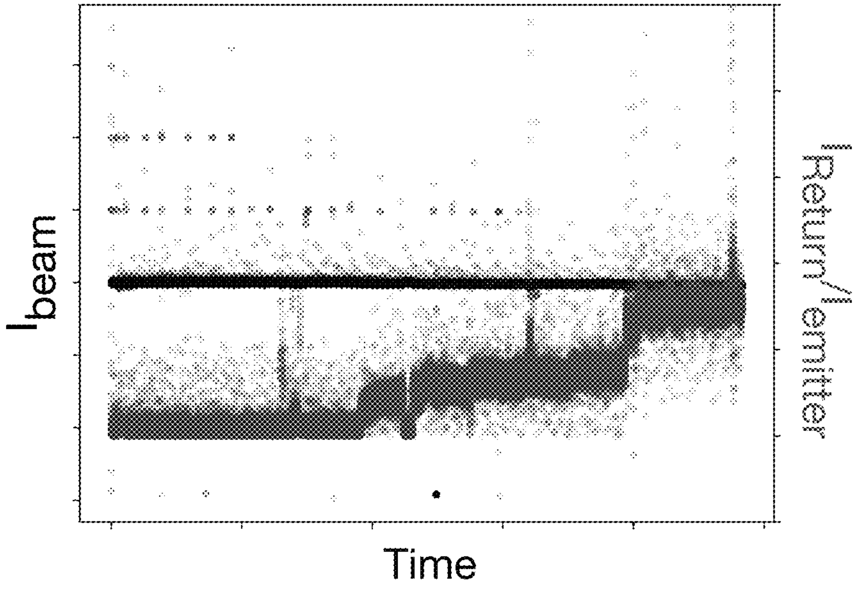
Figure 8C:
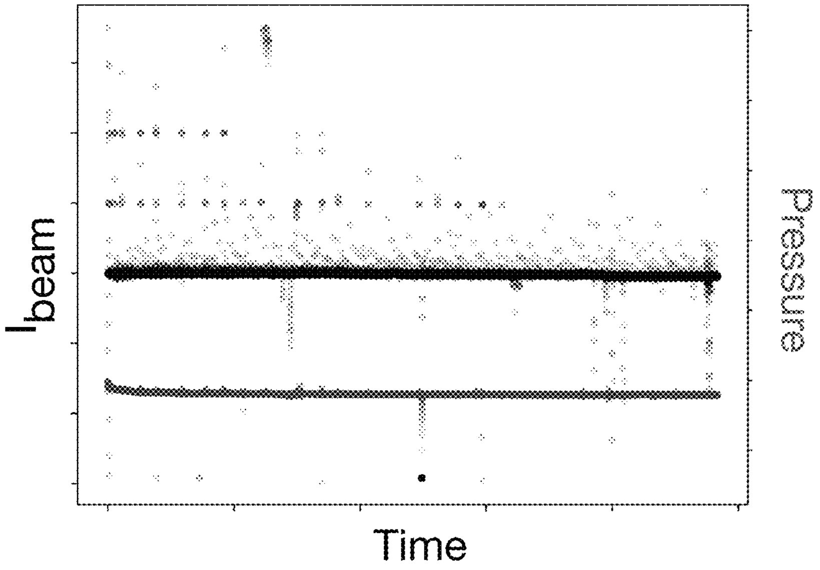

First, variants of the apparatus enable long lifetime and high stability of the emitters and emitter arrays, for example as shown in FIGS. 8A-8C. In specific variants, the long lifetime and high stability can be enabled by the high uniformity between different emitters and/or by low defect presence in the emitter array(s). In specific variants, the emitter design leads to decreased accumulation of propellant on the emitter array surface, which decreases the probability of a high-impedance liquid short in the system.

Second, variants of the apparatus can enable more controlled (e.g., more even, more symmetric, more predictable, etc.) emission of the propellant spray (e.g., with respect to the location of emission site(s) on the emitter(s), variations of emission within emitter arrays, etc.). In variants, the more even emission can be enabled by the high uniformity of the emitter array (e.g., similarity between different emitters, narrow base size distribution, narrow height distribution, etc.), smooth topography (e.g., surface roughness) of the emitter(s), and/or by the narrow pore size distribution within the emitter array.

Third, variants of the apparatus can enable more suitable electric fields to be generated for the propellant emission. In variants, the electric fields can be enabled by controlling the radius of curvature, aspect ratio (e.g., ratio of the base length to the height), height, geometry, separation distance (e.g., pitch), and/or by changing any suitable characteristic of the emitters.

Fourth, variants of the apparatus can enable more controlled direction of propellant emission. In variants, the direction of propellant emission can be controlled by controlling the radius of curvature of the emitters. In specific variants, reducing the radius of curvature of the tip can reduce the possibility of emission of working material in multiple directions from a single emitter.

Fifth, variants of the method of manufacture can enable control over pore size distribution, emitter uniformity (e.g., narrow size distribution, narrow aspect ratio distribution, etc.), shape and characteristics of variants of the apparatus (e.g., radius of curvature, surface roughness, etc.), relative thickness of substrate material to the emitter height, and/or apparatus properties.

However, the apparatus can confer any other suitable benefits.

3. Apparatus.

Figure 7:
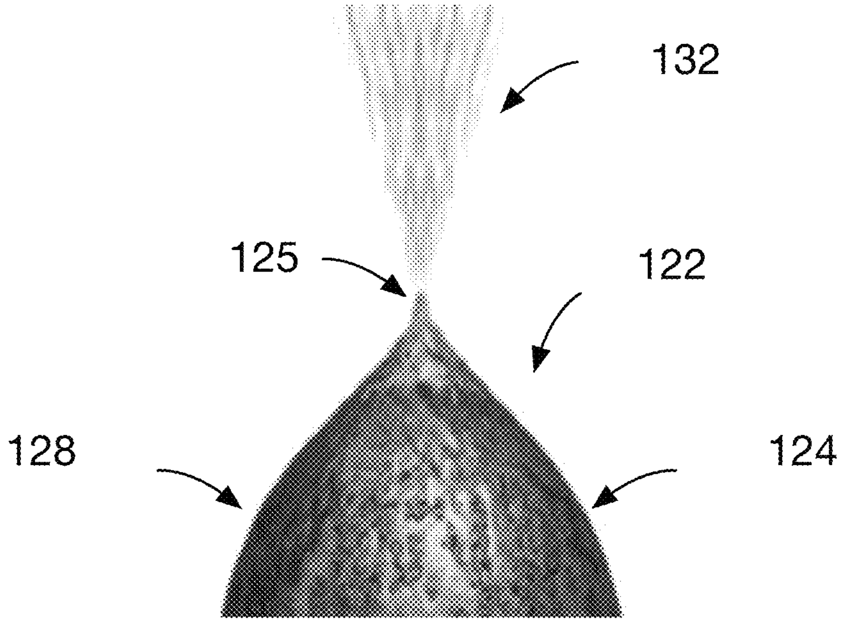
FIG. 7 is a schematic representation of an example of an emitter ejecting propellant.

The emitter array 120 preferably functions to emit working material 132 (e.g., propellant) in a plume (e.g., for example as shown in FIG. 7, etc.). Working material is preferably emitted from at or near the apex (e.g., tip) of each emitter, but can be emitted from the substrate, side wall of one or more emitter, inter-emitter sites (e.g., between two or more emitters), and/or from any suitable location. The emitter array can alternatively function as a needle (e.g., injection needle, extraction needle, etc.) and/or perform any other suitable functionality.

Figure 3A:
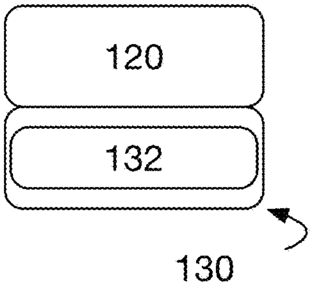
FIGS. 3A and 3B are schematic representations of examples of an emitter array and reservoir.
Figure 3B:
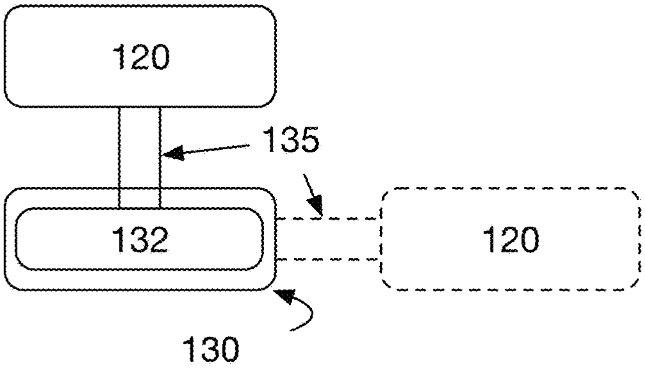
Figure 4A:
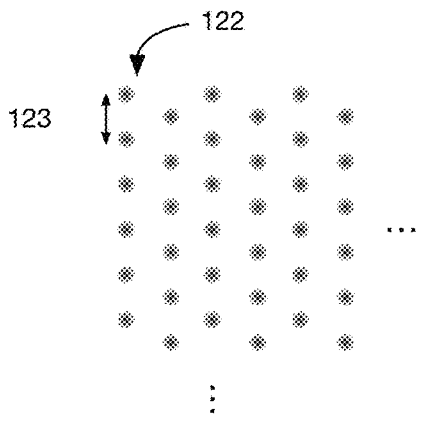
FIGS. 4A, 4B, 4C, 4D, 4E, and 4F are schematic representations of examples of a top-down view of an emitter array with topological shading.
Figure 4B:
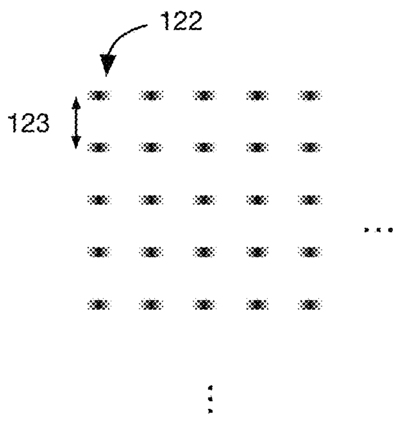
Figure 4C:
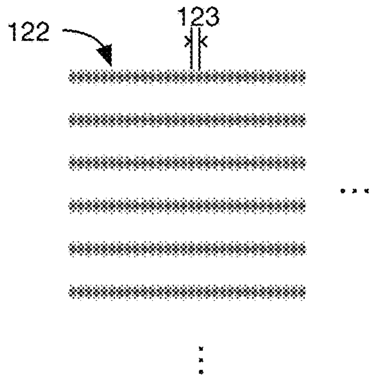
Figure 4D:
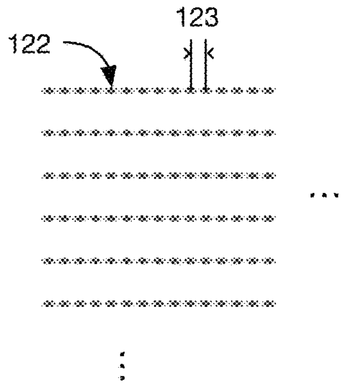
Figure 4E:
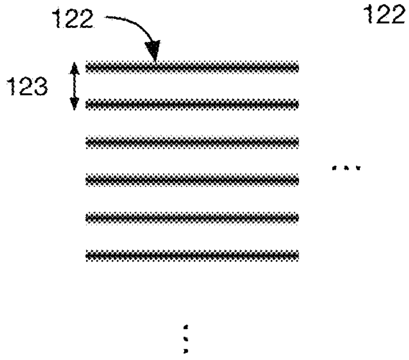
Figure 4F:
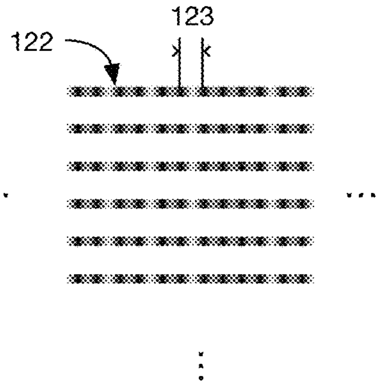

The emitter array 120 is preferably connected to a reservoir 130 and coupled to working material 132, for example as shown in FIGS. 3A and 3B. Alternatively or additionally, the emitter array can store the working material. However, the emitter array can be coupled to the power supply, control system, and/or couple to any other element(s).

The emitter array 120 preferably includes one or more emitters 122 and can be connected to (e.g., grown on, coupled to) a substrate 121. However, the emitter array can include any additional or alternative elements. When the system includes multiple emitter arrays, different arrays or subsets thereof (e.g., operated similarly or differently) can be arranged on the same or different substrate.

The emitter(s) 122 are preferably characterized by a set of emitter parameters, but can be otherwise suitably defined. The emitters are preferably internally and externally wetted (e.g., working material contact angle between 0° and 180° such as 5°, 10°, 15°, 20°, 30°, 45°, 50°, 60°, 75°, 90°, 95°, 100°, 115°, 130°, 145°, 160°, 170°, 180°, etc.), but can be internally wetted, externally wetted, have different wetting properties (e.g., degrees of wetting between interior surfaces and exterior surfaces), and/or have any wetting properties. Emitter parameters (e.g., emitter features) can include shape (e.g., geometric form; height; apex radius of curvature; base size such as length, width, radius, etc.; etc.), roughness (e.g., surface roughness), material, porosity (e.g., pore density, pore size, pore size distribution, void fraction, etc.), side wall geometry (e.g., curvature of edges), tortuosity, and/or other suitable parameters. The emitter parameters can depend on other emitter parameters, the working material, desired working material emission properties, manufacturing processes (e.g., the method of manufacture), and/or depend on any other characteristic. In a first specific example, the emitter height can depend on the emitter material. In a second specific example, the emitter shape can depend on the emitter porosity (e.g., pore density, pore size, pore distribution, etc.). In a third specific example, the emitter shape can depend on the desired working material emission properties (e.g., uniformity, spread, etc.). In a fourth specific example, the emitter material can be selected based on the working material. The emitter parameters are preferably fixed (e.g., values, properties, ratio relative to other parameters, ranges, etc.) properties. However, additionally or alternatively, the emitter parameters can change during use, change as a result of use, change over time, be actively controlled, and/or may change at any suitable time.

The term "emitter parameter' and related terms (such as shapes, sizes, heights, radius of curvature, geometries, morphologies, etc.) as utilized herein can refer to: the actual geometry and/or morphology of the emitter(s), the approximate geometry and/or morphology of the emitter(s) (e.g., emitter parameter is as described to within a threshold or tolerance), the geometry and/or morphology of the emitter(s) (e.g., porous emitters) if the emitters were solid, and/or otherwise describe the emitter parameters.

Figure 5A:
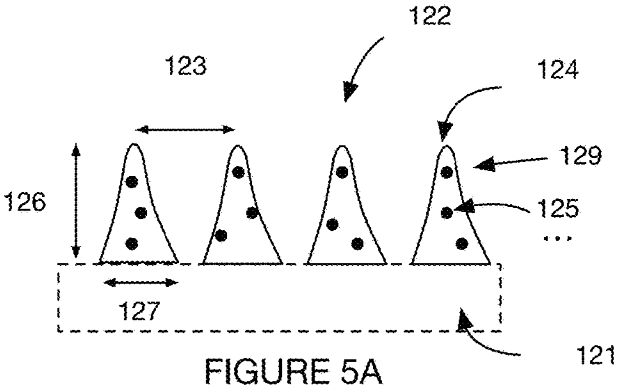
FIGS. 5A, 5B, 5C, 5D, and 5E are schematic representations of examples of a side view of an emitter array.
Figure 5B:
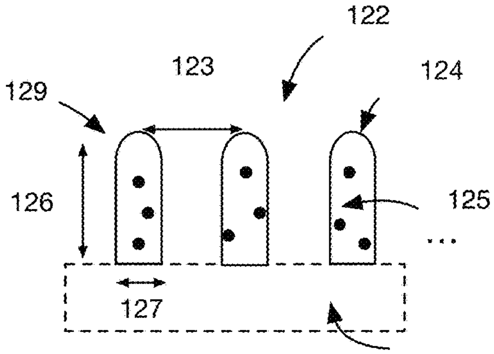
Figure 5C:
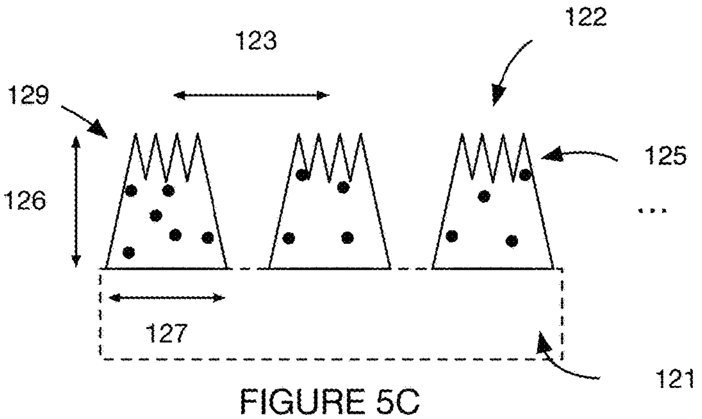
Figure 5D:
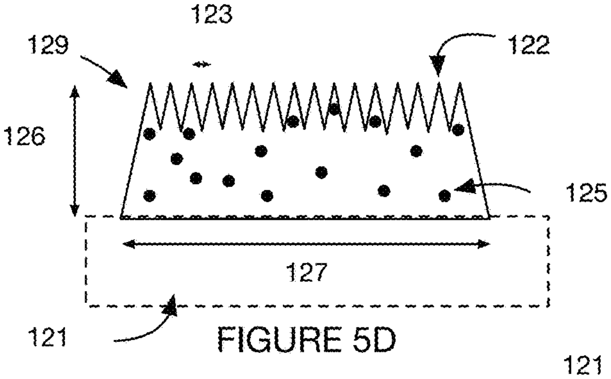
Figure 5E:
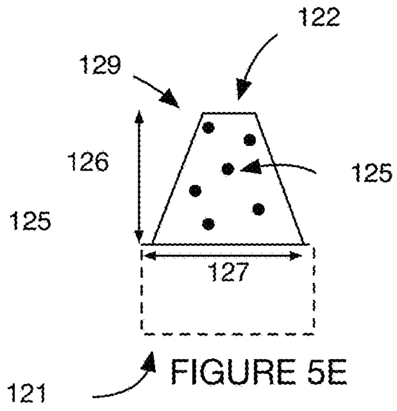
Figure 6A:
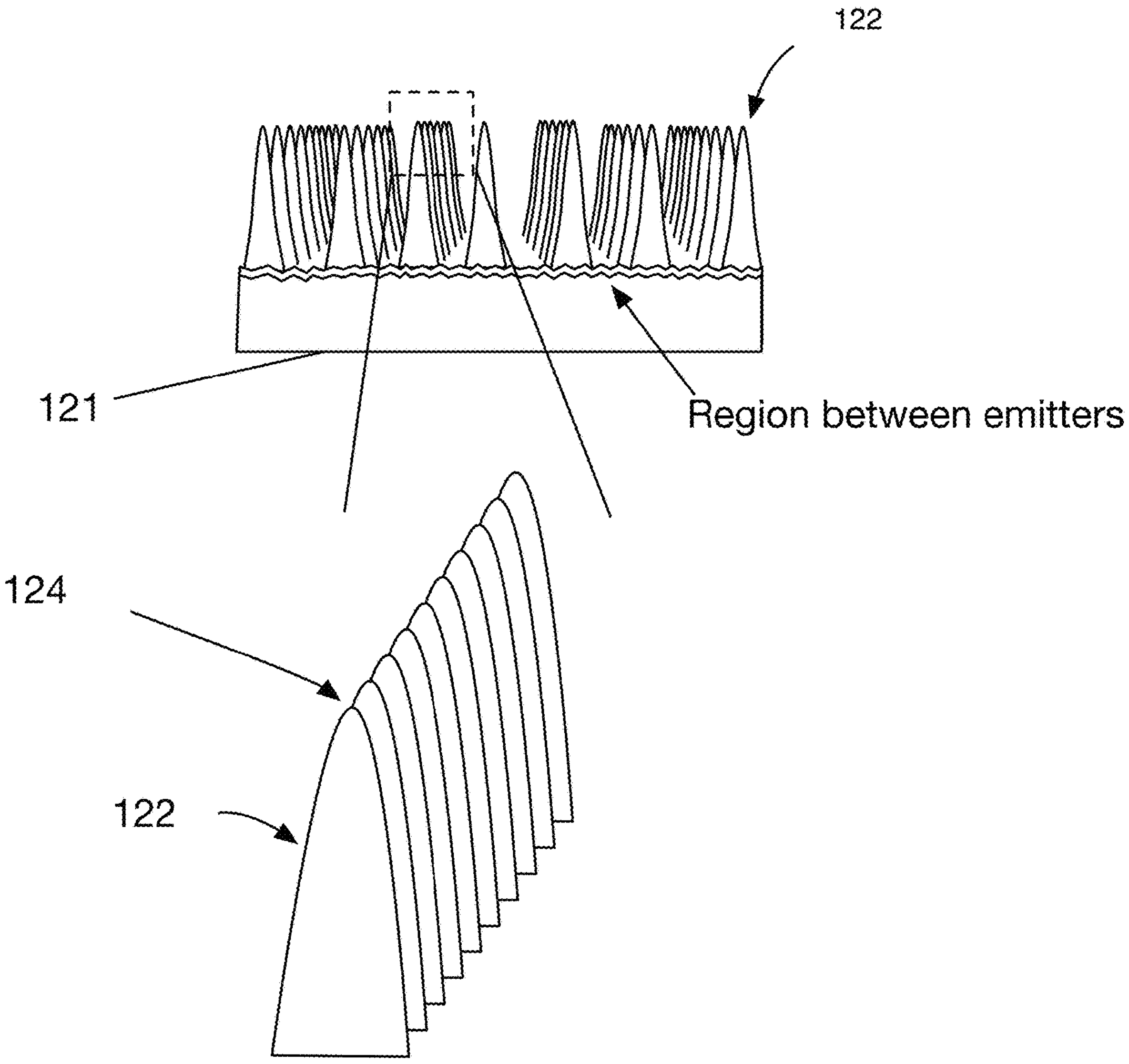
FIG. 6A is a perspective view of an example of an emitter array and a closer view of example emitters.
Figure 6B:
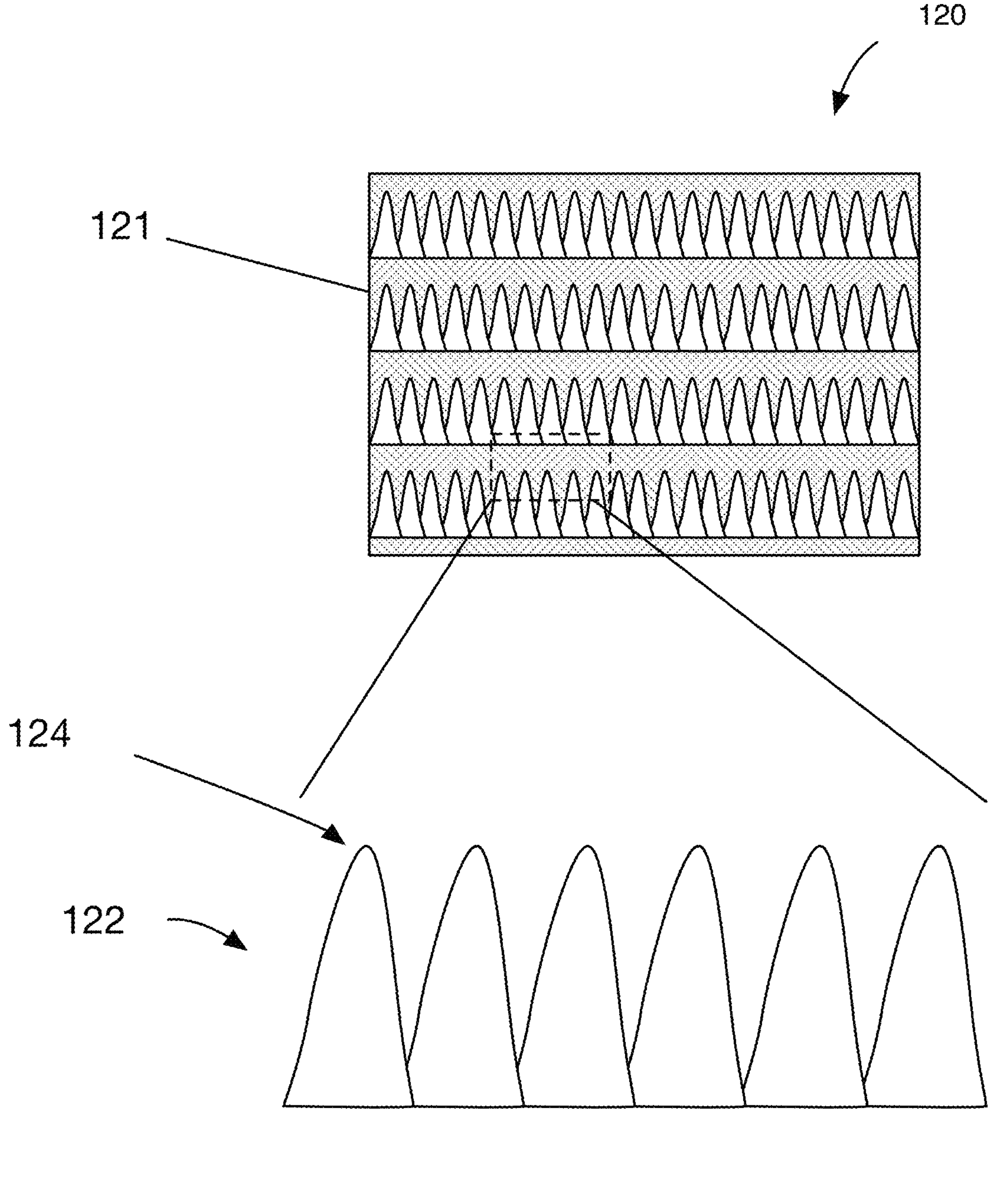
FIG. 6B is an isometric view of an example of an emitter array and a closer view of example emitters.
Figure 6C:
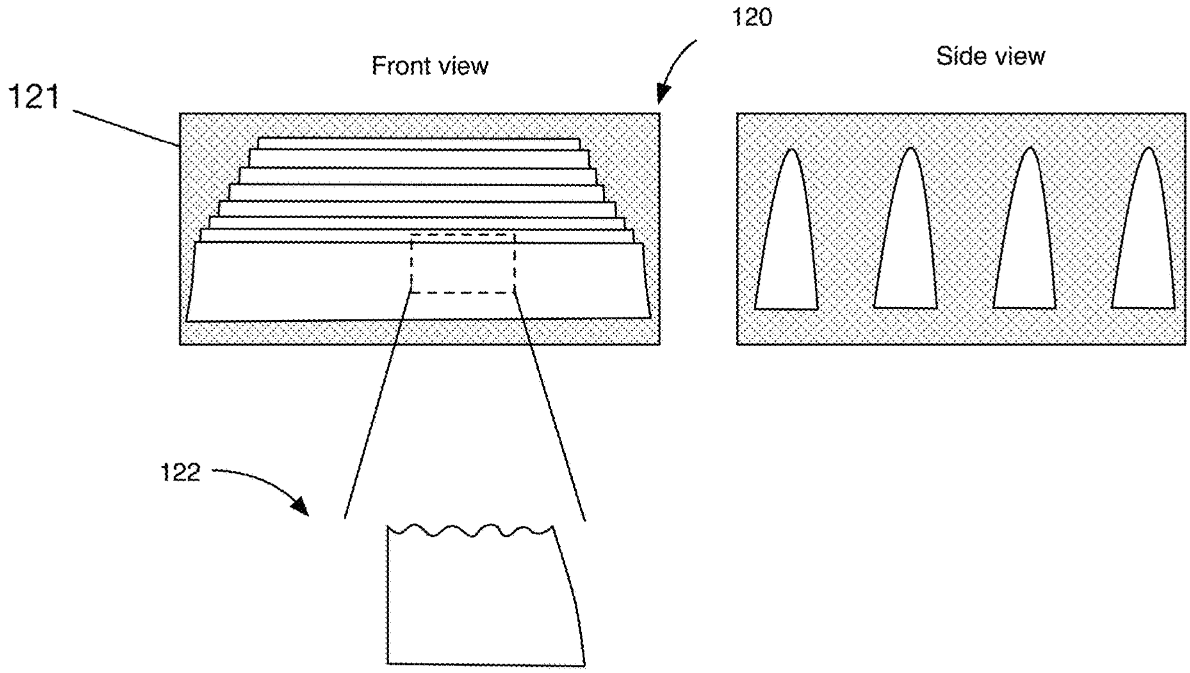
FIG. 6C is a perspective view of an example of an emitter array and closer view of example emitters.

The shape of the emitter preferably defines a base, edges (e.g., side walls 129), a height 126, and an apex 124. However, the shape may define a subset of the base, edges, height, and apex, and/or be otherwise suitably defined. The shape (e.g. in three dimensions, geometrical form, etc.) can be one or more of: a right circular cone a cylinder, an oblique cone, an elliptic cone, a pyramid (e.g., a tetrahedron, square pyramid, oblique pyramid, right pyramid, etc.), a prismatoid (e.g., as shown in FIG. 5E), a rectangular cuboid, hemispherical, wedges, hemi-ellipsoidal, paraboloid, comb, as shown in FIGS. 5A-5E, and/or any other suitable shape. The shape of the emitter along a longitudinal cross section (e.g., in a plane perpendicular to the emitter base, in a plane perpendicular to the substrate, etc.) can be polygonal (e.g., triangular), Reuleaux polygons (e.g., Reuleaux triangles), spherical polygons (e.g., spherical triangles), rounded polygons, rounded semipolygons, rectangular (e.g., with serrations or crenates along the top), semicircular, stadium-shaped, Vesica piscis, oval, semioval, hemistadium, parabolic, or have any other suitable shape. The shape of the emitter along a transverse cross section (e.g., in a plane parallel to the emitter base, in a plane parallel to the substrate, etc.) can be circular, semicircular, oval, semioval, stadium, polygonal (e.g., triangle, square, etc.), superelliptical (e.g., squircle), linear, serpentine, or have any other suitable shape.

The apex 124 is preferably characterized by a rounded end (e.g., hemispherical, semioval, parabolic, with one or more apex radii of curvature, etc.). However, the apex can additionally or alternatively be sharp (e.g., come to a point), wedged, sawtooth (e.g., serrated), sinusoidal, curved (e.g., serpentine), and/or have any suitable form factor. The apex is preferably circularly symmetric; however, additionally or alternatively, the apex can have inversion symmetry, reflection symmetry (e.g., reflection about a single axis, reflection about multiple axes, one line of symmetry, two lines of symmetry, more than two lines of symmetry, etc.), rotational symmetry, rotoreflection symmetry, be asymmetric, and/or have any suitable symmetry.

In specific examples, an emitter apex can correspond to (e.g., be characterized by) a symmetry group (e.g., in Schönflies notation) such as $C_n$, $C_{nh}$, $C_{nv}$, $S2_n$, $C_{ni}$, $D_n$, $D_{nh}$, $D_{nd}$, T, $T_d$, $T_h$, O, $O_h$, I, $I_h$, and/or any suitable symmetry, where n corresponds to the number of rotation axes (e.g., 1, 2, 3, 4, 5, 6, 10, 12, 18, 20, ∞, etc.). In related examples, the emitter array can correspond to (e.g., be characterized by) a symmetry group (e.g., in Hermann-Mauguin notation) such as p1m1, p1g1, c1m1, p2mm, p2mg, p2gg, c2mm, p4mm, p4gm, p6mm, p1, p2, p3, p3m1, p31m, p4, p6, and/or any symmetry group. However, the emitter array can be asymmetric and/or have any suitable symmetry.

The size of the apex (e.g., lateral extent, longitudinal extent, etc.) can be the same as the size of the emitter base, larger than the emitter base, and/or be smaller than the emitter base.

The apex radius of curvature (e.g., radius of curvature) preferably functions to enhance the local electric field experienced by the working material (e.g., by virtue of the wetted working material assuming the shape of the apex). The enhanced local electric field can lead to localized emission of working material (e.g., preferential emission from locations with local extrema in the electric field, from locations with a threshold electric field, etc.). The operating voltage (e.g., of the apparatus, of the emitter, of the emitter array, etc.) can depend on (e.g., be influenced by) the apex radius of curvature. However, the operating voltage can be independent of the apex radius of curvature. However, the radius of curvature can perform any suitable function. The radius of curvature preferably does not depend on the working material; however, the radius of curvature can depend on the working material.

The radius of curvature is preferably defined along at least one reference axis (e.g., a longitudinal axis, a transverse axis, any axis between the longitudinal axis and transverse axis, an axis perpendicular to the alignment axis of the emitter to the counter electrode, etc.). However, the radius of curvature can be defined along multiple axes (e.g., longitudinal and transverse), off-axis relative to the primary axes of the shape (e.g., axis tilted from the longitudinal axis), and/or be otherwise suitably defined. The radius of curvature can be constant or vary (e.g., according to an equation, randomly, in a manufactured manner, etc.). The radius of curvature (e.g., maximum radius of curvature, minimum radius of curvature, average radius of curvature, median radius of curvature, most common radius of curvature, etc.) can be about 0.05 μm, 0.1 μm, 0.25 μm, 0.5 μm, 1 μm, 5 μm, 10 μm, 25 μm, 50 μm, 100 μm, 200 μm, 0.25-2 μm, 0.5-25 μm, 1-10 μm, 1-2 μm, 4-6 μm, 10-100 μm, and/or can be any suitable size or size range.

In a first example, the radius of curvature can be the same along any reference axis (e.g., the apex can be hemispherical). In a second example, the radius of curvature can different along different reference axes (e.g., perpendicular reference axes). In a specific variant of the second example, the apex can be hemiellipsoidal and/or semiovoid, In a third example, the apex can have a radius of curvature along one reference axis and no radius of curvature along another reference axis. In a specific variant of the third example, the apex can be rounded along the reference axis and substantially linear along the other reference axis. However, the apex can be pointed (e.g., have a radius of curvature larger than the apex, than the emitter height, that approximates an infinite radius of curvature, etc.) along multiple reference axes (e.g., the apex can be pyramid shaped, prism shaped, etc.) and/or have any suitable radius of curvature and/or shape.

The height 126 of the shape (e.g., emitter height) preferably functions to determine the electric field that the working material is exposed to (e.g., the difference in electric field experienced by the working material at the apex and working material at the base of the emitter, enhance the electric field, etc.) and/or influence the working material impedance (e.g., flow impedance, electric impedance, etc.). However, the height can perform any suitable function. The height 126 is preferably defined from the base 127 (and/or the substrate's top face or proximal face) to the apex, but can be defined from the substrate face opposing the emitter, from the working material reservoir, or otherwise defined. The height preferably depends on the desired working material emission properties, emitter material, emitter porosity, tortuosity, and/or the base; however, the height can be independent of the working material emission properties, independent of the base, and/or otherwise suitably determined. The height can be about 10 μm, 20 μm, 50 μm, 75 μm, 100 μm, 150 μm, 200 μm, 300 μm, 450 μm, 500 μm, 800 μm, 1 mm, 10-1000 μm, 200-750 μm, 400-500 μm, and/or any other suitable value.

The base 127 of the shape (e.g., emitter base) preferably functions to influence the working material impedance; however, the base can perform any suitable function. The base dimensions and/or shape preferably depends on the height; however, the base can be independent of the height. The base preferably has a base lateral extent (e.g., width) and a base longitudinal extent (e.g., orthogonal to and in the same plane as the lateral extent, length, etc.). The length and width of the base are preferably the same; however, the length and width can be different. The length can be 10 μm, 25 μm, 50 μm, 100 μm, 150 μm, 250 μm, 300 μm, 350 μm, 500 μm, 750 μm, 1 mm, 1.5 mm, 2 mm, 2.5 mm, 3 mm, 4 mm, 5 mm, 7.5 mm, 10 mm, 10-350 μm, 215-260 μm, or any suitable size. The width can be 10 μm, 25 μm, 50 μm, 100 μm, 150 μm, 250 μm, 300 μm, 350 μm, 500 μm, 750 μm, 1 mm, 1.5 mm, 2 mm, 2.5 mm, 3 mm, 4 mm, 5 mm, 7.5 mm, 10 mm, 10-350 μm, 215-260 μm, or any suitable size.

The edge(s) of the shape (e.g., emitter side wall(s) 129) can direct working material toward the apex (e.g., using the geometry, Van der Waals, pressure, induced pressure differentials, etc.); however, the edge can alter the electric field experienced by the working material and/or serve any suitable function. The edge of the shape can be linear, curved (e.g., concave, convex, sinusoidal, serpentine, etc.), segmented (e.g., one or more line segments with the same or varying slope, one or more curved sections with different curvatures, a combination of one or more line segments and one or more curved segments, etc.), include saddle points, include inflection points, a combination of profiles, and/or any suitable shape. The side wall can be determined based on the emitter manufacture (e.g., method of manufacture, processing, etc.), emitter material, working material, emitter geometry, and/or any suitable property. In variants with a plurality of discrete side walls, the side walls can have the same or different geometries. The side walls preferably taper from the emitter base to the apex, but can expand from the base to the apex, expand and contract one or more times between the emitter base and the emitter apex, be serpentine, remain a substantially constant size (e.g., the size of the bottom of the side wall is less than 1%, 5%, 10%, etc. different from the size of the top of the side wall), radially taper, azimuthally taper, radially expand, azimuthally expand, be asymmetric (e.g., have different taper angles on different faces, taper from one face and expand along a different face, etc.), and/or have any geometry.

In a specific example, the side wall can be concave (e.g., have a radius of curvature between about 10 μm and 10 mm; have a radius of curvature less than about 10 μm; have a radius of curvature greater than 10 mm; etc.) between the emitter base and the emitter apex. In a second specific example, the side wall can be approximately perpendicular (e.g., less than about a 1°, 5°, etc. tilt from being perpendicular) to the substrate surface (and/or emitter base). However, the side wall can be otherwise arranged.

The surface of the emitter is preferably uniform (e.g., homogeneous, no discernable surface characteristics such as: striations, gouges, ridges, tool marks, burnt locations, melted locations, valleys, peaks, etc.). However, additionally or alternatively, the surface can have nonuniformities below a predetermined threshold (e.g., determined based on a given application, <1 surface characteristic, <5 surface characteristics, <1 surface characteristic per $cm^2$, <10 surface characteristics per $cm^2$, etc.), manufactured nonuniformities (e.g., lower-porosity shell, uneven thickness, hierarchical structure such as changes in pore size throughout the material, etc.; to impart desired working material impedance qualities, to impart desired working material emission properties, etc.), unintentional nonuniformities (e.g., manufacturing nonuniformities, accidental nonuniformities, etc.), and/or any suitable uniformity.

The surface preferably has a surface roughness, where the surface roughness can be defined as the difference between the average surface level and a maximum surface characteristic size. Alternatively or additionally, the surface roughness can be defined as the difference between a maximum surface characteristic size and a minimum surface characteristic size, difference between the average surface level and the average surface characteristic size (e.g., average over many surface characteristics, average over surface characteristic in a specific area, average over surface characteristics that are higher than the surface, etc.), arithmetic mean deviation, root mean squared, maximum valley depth, maximum peak height, skewness, kurtosis, based on the slope of the surface characteristics, and/or may be otherwise defined. The surface roughness is preferably smaller than a predetermined value (e.g., <10 μm, <1 μm, <100 nm, smaller than the radius of curvature, smaller than the height, etc.); however, the surface roughness can be larger than a predetermined value (e.g., >100 pm, >1 nm, >10 nm, etc.), and/or have any suitable size. The surface roughness size is preferably determined based on an emitter parameter value (e.g., smaller than an emitter parameter such as height, radius of curvature, base, etc.); however, the surface roughness can be defined based on the emitter material, relative to a molecule (e.g., relative to a working material size, relative to the size of a molecule of the emitter material, etc.), and/or be otherwise suitably determined.

The surface (e.g., interior surface, exterior surface, etc.) of the emitter can be associated with a surface energy. The surface energy can function to modify the wetting behavior of the working material (e.g., to increase flow; to decrease flow such as to prevent spontaneous inflow, require pressure to initiate imbibition of the working material, etc.; etc.), modify the working material interfacial interactions (e.g., with the emitter, with the environment, with other components, modify electrokinetic behavior such as electro-osmosis, streaming potential/current, etc.; hinder and/or enhance electrochemical reactions; etc.), and/or any suitable functions. The wetting behavior of the working material is preferably the same for the internal and external surfaces of the emitters, but can be different (e.g., nonwetting on internal surface and wetting on external surfaces, wetting on internal surfaces and nonwetting on external surfaces, different degrees of wetting for internal and external surfaces, different contact angles, etc.). The surface energy can be global (e.g., same for the entire emitter array, same for the material, etc.) or local (e.g., for a single emitter, a subset of emitters, based on the method of manufacture, for external surfaces, for internal surfaces, etc.). The surface energy can be controlled by modifying the surface roughness (e.g., surface roughness of the emitter, surface roughness of the region between emitters, etc.), using coatings (e.g., polymeric, ceramic such as lanthanide ceramics, metals including noble metals Pt and Au, etc.), depositing charge (e.g., electron bombardment, ion bombardment, etc.), modifying the porosity, modifying the emitter material, etc. The surface energy can be any suitable value or range thereof between 10-3000 mN $m^{-1}$ (e.g., 10-25 mN $m^{-1}$, 35-50 mN $m^{-1}$, 100-250 mN $m^{-1}$, 500-100 mN $m^{-1}$, >1000 mN $m^{-1}$) and/or have any suitable value and/or range.

In some variants, the surface of the emitters can include structures to enhance and/or direct working material toward (or away) from the emitter apex, for example when the emitter is externally wetted with working material. For example, the structures can include: baffles, walls, hills, valleys, and/or other structures. The structures preferably extend at least partially between the emitter base and the emitter. The structures can extend straight, helically, tortuously, in a serpentine manner, and/or in any orientation. However, the structures can be arranged radially, can extend into the emitter, and/or can be otherwise arranged.

The emitter material is preferably suitable for operation/exposure (e.g., retains structure, does not degrade, etc.) to the space environment (e.g., high vacuum, extreme temperatures, high radiation, atomic oxygen, atmospheric plasma, etc.); however, the emitter material can be otherwise selected. The emitter material can be a dielectric (e.g., titanium oxide ($TiO_x$), silicon oxide ($SiO_x$), zirconium oxide ($ZrO_x$), hafnium oxide ($HfO_x$), aluminum oxide ($AlO_x$), silicon nitride ($SiN_x$), tantalum oxide ($TaO_x$), strontium titanate ($Sr(TiO_3)_x$), silicon oxynitride ($SiO_xN_y$), lanthanum oxide ($LaO_x$), yttrium oxide ($YO_x$), etc.), insulator, ceramic, conductive material (e.g., metal such as tungsten, nickel, magnesium, molybdenum, titanium, etc.; conductive glass such as indium tin oxide (ITO), fluorine doped tin oxide (FTO), etc.; etc.), gel (e.g., xerogel, aerogel, sol-gel, hydrogel, etc.), glass (e.g., silicate; borosilicate; fused silica; quartz; aluminate; Vycor; Shirasu porous glass (SPG); pure silica, impure silica such as 99.9, 99.5, 99, 98, 97, 95, 90, 85, 80, 80-99.9% silicon oxide; germanates; tellurites; antimonates; arsenates; titanates; tantalates; nitrates; phosphates; borates; carbonates; etc.), polymers (e.g., conductive, dielectric, copolymers such as Nafion, etc.), etc. The emitter material can be substantially pure (e.g., more than 80%, 85%, 90%, 95%, 98%, 99%, etc.), or have any suitable mixture of materials. The emitter material can be crystalline, polycrystalline, and/or amorphous.

The emitter preferably has one or more pores (e.g., nanoporous, microporous, mesoporous, microporous, etc.). The pores function to control the working material emission; however, the pores can have any other suitable function. The pores can be a materials property (e.g., depend on the material, are intrinsic structural features of the material, etc.); however, additionally or alternatively, the pores can be independent of the material, machined, and/or otherwise suitably determined. The pore(s) are preferably characterized by a pore size, pore density, and pore distribution; however, the pores can be otherwise suitably characterized.

The pore distribution is preferably stochastic (e.g., randomly distributed, uniformly distributed, defined by a probability distribution such as a normal distribution, etc.) across the emitter surface. However, the pore distribution can be nonstochastic (e.g., controlled, nonrandom, larger pores segregated from smaller pores, etc.), manufactured (e.g., pore location intentionally selected such as pores localized to base of emitter, apex of emitter, etc.; areas with more pores; areas with fewer pores; etc.), quasi-stochastic, be patterned (e.g., form a gradient such as: larger pores near the base and smaller pores near the apex or vice versa, azimuthal pore size gradient, radial pore size gradient, etc.; define a pattern; etc.), and/or any other suitable distribution. The pore density can be <1 pore/100 $nm^2$, <1 pore/500 $nm^2$, <1 pore/1 $\mu m^2$, <1 pore/10 $\mu m^2$, <1 pore/100 $\mu m^2$, <1 pore/1 $mm^2$, >1 pore/50 $nm^2$, >1 pore/100 $nm^2$, >1 pore/500 $nm^2$, >1 pore/1 $\mu m^2$, >1 pore/10 $\mu m^2$, >1 pore/100 $\mu m^2$, >1 pore/1 $mm^2$, and/or any suitable pore density or range thereof.

The porosity (e.g., percentage of the emitter that is void, void fraction, etc.) can be less than 10%, 10%, 20%, 30%, 40%, 50%, 60%, 70%, 80%, 90%, greater than 90%, 5-25%, 10-50%, 25-75%, 50-95%, and/or any percentage.

The pore size can be about 10 nm, 20 nm, 25 nm, 30 nm, 40 nm, 50 nm, 60 nm, 70 nm, 75 nm, 80 nm, 90 nm, 100 nm, 125 nm, 150 nm, 175 nm, 200 nm, 300 nm, 500 nm, 750 nm, 1000 nm, 10-1000 nm, 2 μm, 5 μm, 10 μm, 20 μm, 50 μm, 60-250 nm, 10-100 nm, 200-500 nm, 500-1000 nm, 1-20 μm, and/or any suitable size or size range. In variants with more than one pore, the pore size(s) are preferably uniform (e.g., narrow pore size distribution; size variation is less than 50%, 40%, 30%, 25%, 20%, 10%, 5%, 1%, etc.; size variation falls on a single size probability distribution; a second statistical moment such as a variance or standard deviation of the pore size distribution is less than 50%, 40%, 30%, 20%, 10%, 5%, 1%, 0.5%, etc. of a first statistical moment such as a mean of the pore size distribution, etc.). However, the pore size(s) can be nonuniform (e.g., size variation contains more than one size probability distributions, etc.), have a broad size distribution (e.g., size variation >25%, >50%, >100%, etc.), and/or have any other suitable size distribution.

In specific variants of the emitter array including more than one emitter, the emitters are preferably arranged in an emitter array, as shown for example in FIGS. 4A-4F, 5A-5D, and 6A-6C; however, the emitters can be arranged randomly, nonordered, and/or otherwise suitably arranged. The emitters within an emitter array are preferably substantially identical, distinct emitters (e.g., have a separation distance between the emitters, have the same emitter parameters, have the same emitter parameters within a distribution such as height varies <1%, <5%, <10% etc.; base varies <1%, <5%, <10%, etc.; pore size varies <1%, <5%, <10%, etc.; etc.). However, the emitter array can include a plurality of nonidentical, distinct individual emitters (e.g., different shapes, different materials, different sizes, different pore sizes, different porosities, etc.), a plurality of substantially identical, nondistinct individual emitters (e.g., base of emitters overlap, edge of emitters overlap, etc.), a plurality of nonidentical, nondistinct individual emitters, and/or any suitable emitters. In variants, non-identical emitters can function to tailor the electric field experienced by the propellant, fluid impedance, propellant emission, and/or can perform any suitable function. The number of individual emitters in an emitter array can be 1; 2; 5; 10; 15; 18; 25; 30; 50; 100; 200; 240; 480; 960; 1,000; 2,000; 2,500; 5,000; 10,000; 20,000; 50,000; 100,000; 200,000; 500,000; 1,000, 000; 1-20, 15-50, 40-100, 100-500; 300-1000; 460-500; 100-1,000,000; greater than 1,000,000 or any suitable number of individual emitters or range thereof. The density of individual emitters in an emitter array can be 0.05 emitters/$mm^2$; 0.1 emitters/$mm^2$; 0.2 emitters/$mm^2$; 0.5 emitters/$mm^2$; 1 emitters/$mm^2$; 5 emitters/$mm^2$; 10 emitters/$mm^2$; 20 emitters/$mm^2$; 30 emitters/$mm^2$; 50 emitters/$mm^2$; 75 emitters/$mm^2$; 100 emitters/$mm^2$; 200 emitters/$mm^2$; 500 emitters/$mm^2$; 1,000 emitters/$mm^2$; 2000 emitters/$mm^2$; 5,000 emitters/$mm^2$; 10,000 emitters/$mm^2$; 20,000 emitters/$mm^2$; 50,000 emitters/$mm^2$; 100,000 emitters/$mm^2$; 200,000 emitters/$mm^2$; 500,000 emitters/$mm^2$; 1,000,000 emitters/$mm^2$; 1-50,000 emitters/$mm^2$; 0.05-1 emitters/$mm^2$; 1-5 emitters/$mm^2$; 10-50 emitters/$mm^2$; 50-200 emitters/$mm^2$; 100-1000 emitters/$mm^2$; 500-20,000 emitters/$mm^2$; greater than 1,000,000 emitters/$mm^2$; less than 0.05 emitters/$mm^2$; or any suitable emitter density or range thereof.

The emitters in the emitter array can be arranged on a two-dimensional lattice on a cartesian grid. The emitters in the emitter array can be arranged on a hexagonal lattice (e.g., triangular lattice), rhombic lattice, square lattice, rectangular lattice, oblique lattice (e.g., parallelogram), concentric circles, serpentine arrangement, and/or on any suitable lattice. However, additionally or alternatively, the emitters in the emitter array can be not aligned to an array, a subset of the emitters can be aligned to an array, randomly positioned, more than one lattice (e.g., overlapping lattices, same lattice type with different orientation(s), different lattice types that meet at an array edge, different lattice types that are overlaid, etc.), arranged on a two-dimensional lattice on a curvilinear grid, arranged on a three-dimensional lattice, or otherwise arranged.

The separation distance between emitters within the emitter array is preferably defined as the apex to apex distance between adjacent emitters; however, additionally or alternatively, the separation distance can be defined as the base to base distance, center of mass to center of mass distance, the separation between lattice positions, and/or otherwise suitably defined. The separation distance is preferably determined based on the emitter parameters (e.g., base size, radius of curvature, height, shape, material, etc.); however, additionally or alternatively, the separation distance can be a predetermined distance (e.g., 10 nm, 50 nm, 100 nm, 250 nm, 500 nm, 1 μm, 2 μm, 5 μm, 10 μm, 25 μm, 50 μm, 100 μm, 200 μm, 300 μm, 500 m, 1 mm, 2 mm, 3 mm, 5 mm, 50-300 μm, 100-750 μm, etc.), depend on the working material, depend on the position within the array (e.g., array center, array edge, array vertex, etc.), can vary within the array (e.g., linearly, radially, etc.), can be random, and/or can be otherwise suitably determined. The separation distance can depend on the direction to other emitters. For example, emitters can have a first separation distance along a first reference axis (e.g., a first direction parallel to a surface of the substrate, parallel to an edge of the substrate, etc.) and a second separation distance along a second reference axis (e.g., perpendicular to the first reference axis, intersecting the first reference axis at any angle, parallel to a surface of the substrate, etc.).

In variants of the emitter array where the individual emitters are distinct, the region between emitters is preferably a substantially flat plane (e.g., feature size <20% of the height of the average emitter, <10% of the height of the average emitter in the array, <5% of the height of the average emitter, <50 μm, <25 μm, <10 μm, etc.). Additionally or alternatively, the region between emitters can be a rough plane (e.g., comprising raised and lowered regions, plane features >20% of the height of the average emitter, etc.), a bowed surface (e.g., lower on one side than the other, lower in the center than at the edge, etc.), a curved surface (e.g., sinusoidal, convex, concave), or have any suitable configuration.

The emitter parameters (e.g., height, aspect ratio, radius of curvature, pore size, porosity, surface energy, surface roughness, pore density, side wall, geometry, emitter material composition, etc.) for emitters of an emitter array are preferably substantially identical and/or uniform (e.g., variance of parameters within the array is less than about 50%, 30%, 25%, 10%, 5%, 1%, etc.; narrow parameter distribution; parameter variation falls on a single parameter probability distribution; a second statistical moment such as a variance or standard deviation of the parameter distribution is less than 50%, 40%, 30%, 20%, 10%, 5%, 1%, 0.5%, etc. of a first statistical moment such as a mean of the parameter distribution, etc.). However, one or more emitter parameters(s) can be nonuniform (e.g., parameter variation contains more than one size probability distributions, etc.), have a broad size distribution (e.g., size variation >25%, >50%, >100%, etc.), and/or have any other suitable size distribution. Each parameter distribution is preferably unimodal, but can be multimodal (e.g., bimodal, trimodal, etc.). The parameter probability distributions are preferably a normal distribution, but can be a Cauchy distribution, a Student's t-distribution, a chi-squared distribution, an exponential distribution, a skewed distribution (e.g., right skewed, light skewed), binomial distribution, Poisson distribution, uniform distribution, U-quadratic distribution, an asymmetric distribution, and/or be any probability distribution.

However, additionally or alternatively, one or more emitter parameters can be nonuniform across the emitter array (e.g., different heights, different aspect ratios, different geometries, different materials, different pore sizes, different surface roughnesses, etc.). For example, the parameters can have a controlled variation of emitter parameters across the array (e.g., radial gradient in parameter(s) such as increasing height from the center of the array to the array edges, linear gradient in parameter(s) such as increasing height from one edge of the array to another edge of the array, changing porosity across the sample, etc.), have randomly varying emitter parameters within the array, have controlled differences (e.g., to correct nonuniformities in electric fields, fluid impedance, etc.), have uncontrolled differences (e.g., manufacturing tolerance, etc.), have a broad parameter probability distribution, and/or have any suitable variation in emitter parameters. In a specific example, the emitter height variation across the emitter array can be <50 μm, <5 μm, <1 μm, or have any other suitable variation.

In specific variants, the emitter array can include one or more defects (e.g., deformed emitters, inoperable emitters, clogged emitters, etc.) that can impact emitter array performance. The emitter array preferably does not include any defects; however, defects may arise during manufacturing, during processing, during use, and/or at other times. Defects are preferably rare (e.g., <0.001%, <0.01%, <0.1%, <1%, <5%, <10%, etc. of total emitters in array); however, additionally or alternatively, defects can be below an emitter array target performance (e.g., emitter array at >99% operation, >95% operation, >90% operation, >80% operation, etc.), enhance device performance, have no impact on device performance, be determined based on the lifetime of the emitter array (e.g., expected lifetime, target lifetime, average lifetime, etc.), and/or be otherwise suitably defined.

The substrate surface is preferably planar (e.g., flat; such as a substrate feature size less than 1 μm, 2 μm, 5 μm, 10 μm, 20 μm, 50 μm, 100 μm, 1 mm, etc.; surface roughness approximately the same as the emitter surface roughness; etc.), but can be structured, curved, serpentine (e.g., wavy), nonplanar, and/or other surface structure. In an example, the substrate surface (e.g., region between emitters) can include hills and valleys. The heights of the hills and the depths of the valleys in the region between emitters are preferably smaller than the feature sizes (e.g., height, radius of curvature, base size, etc.) of the individual emitters. In this specific example, the hills and valleys can have planar apexes; however, additionally or alternatively, the hill and valley apexes can be pointed, curved, and/or have any suitable geometry. In a second example, the individual emitters in an array can have nonuniform heights. In this example, the nonuniform heights can be manufactured to correct for asymmetries in the emitter geometries (e.g., fluid impedance mismatch, asymmetries in an applied electric field such as from an extractor, asymmetries in a substrate surface flatness, etc.).

In variants, the emitter array can include one or more guard emitters, which preferably function to externally wet with working material and/or emit working material from an external surface. The guard emitters are preferably solid, but can be porous and/or have any suitable structure. The guard emitters can have the same or different shapes as other emitters. The guard emitters can be made of the same or different emitter material. The emitter array can include fewer guard emitters than emitter, more guard emitters than emitters, and/or equal numbers of guard emitters and emitters. The guard emitters can be interspersed among the emitters (e.g., randomly distributed, at manufactured locations within an emitter array, at intentional locations, etc.), can partially or fully surround an emitter, can be partially or fully surrounded by emitters, can be located along a reference line (e.g., a reference line of guard emitters within the emitter array, an edge of the emitter array, a perimeter of the emitter array, etc.), occupy specific sites within the emitter array, be located between emitters, and/or be otherwise located.

In a specific example, a guard emitter can be made from an emitter that has been filled (e.g., pores of the emitter have been filled in such as 50%, 60%, 70%, 80%, 90%, 100%, 50-100%, etc. of the void space within an emitter is filled; filled with emitter material; filled with nano- and/or microparticles; etc.), a coated emitter (e.g., external coating that prevents working material from being emitted from the guard emitter, internally coated to modify working material fluid properties within the internal surface of the guard emitter, etc.), an annealed emitter (e.g., an emitter where the pores have been fused together), a separate structure from existing emitters, and/or any suitable guard emitter.

The substrate preferably functions to support emitters; however, additionally or alternatively, the emitters can be manufactured from the substrate (e.g., machined from substrate stock material), and/or serve any other suitable function. The substrate is preferably coupled to and arranged below emitters. The substrate material is preferably the same material as the emitter; however, the substrate material can be any other suitable emitter material and/or any other suitable material. The substrate thickness is preferably thicker than the emitter height (e.g., 2×, 5×, 10×, 25×, 50×, 100×, 250×, 1000×, etc.); however, the substrate thickness can be thinner (e.g., 0.1×, 0.2×, 0.5×, 0.75×, etc.), the same as the emitter height, any suitable value or range thereof between 0 mm to 1.1 mm (e.g., 0.1 mm-1.1 mm), and/or independent of the emitter height. The substrate thickness can be determined based on the fluid impedance of the working material, a target strength to support the emitter array(s), and/or be otherwise suitably determined.

The substrate is preferably coupled to (e.g., in fluid communication with) the reservoir. The substrate preferably fluidly couples working material from the reservoir to the emitter array. The substrate can fluidly couple the reservoir to the emitter array via pores (e.g., a porous internal structure), manifolds, capillaries, across one or more surfaces of the substrate, and/or in any manner. The substrate volume (e.g., substrate porous network) is preferably coupled to each emitter of the emitter array (and/or emitter arrays). However, the substrate volume can be separated into subvolumes where each subvolume is coupled to a subset of emitters of the emitter array(s) for example by including separators (e.g., internal walls, filled substrate, etc.) and/or any suitable structural elements.

In variants including a working material (e.g., propellant), the propellant preferably contains and/or can be ionized into separate ions (e.g., cations, anions, etc.) that can be emitted; however, the propellant can be otherwise configured. The propellant is preferably stored in a reservoir and coupled to the emitter array (e.g., via the substrate, via a manifold, etc.); however, the propellant can be coupled to a reservoir, and/or otherwise suitably arranged. The propellant is preferably in electrical communication with the power supply (e.g., via a distal electrode, directly, etc.). The propellant preferably does not react with or damage the emitter array; however, alternatively or additionally, the propellant can react (e.g., undergo a chemical transformation, induce a physical transformation, deform, etc.) with the emitter array at specific temperatures (e.g., >275 K, >500 K, >1000 K, >2000 K, etc.), can not react with the emitter array in conditions found in the space environment (e.g., low pressure, etc.), reacts with the emitter array slowly, reacts with the emitter array, and or can have any other suitable interaction with the emitter array.

The propellant is preferably an ionic liquid (e.g., an ionic compound such as an anion bound to a cation that is liquid at T<100° C.). The ionic liquid can be organic or inorganic salts that exist in a liquid state at room temperature and pressure, and can include asymmetric or symmetric bulky organic or inorganic cations and/or bulky organic or inorganic anions, charged polymers, or have any other suitable composition. The ionic liquid can be: a long chain ionic liquid (e.g., ions with long aliphatic side chains such as those containing at least six carbon atoms), a short chain ionic liquid (e.g., ions with short aliphatic side chains such as those containing at most six carbon atoms), branched chain ionic liquid, a mixture thereof, or be any other suitable ionic liquid. However, additionally or alternatively, the propellant can be a conductive liquid, a room-temperature solid (e.g., metals such as bismuth, indium, etc.; iodine; salts; room temperature ionic solids that can be liquified; etc.), liquid metal (e.g., caesium, rubidium, gallium, mercury, etc.), gases (e.g., xenon, argon, etc.), liquids (e.g., solvents, salt solutions, etc.), mixtures (e.g., alloys; solutions; fusible alloys such as Na—K, rose's metal, Field's metal, Wood's metal, Galistan, etc.; combinations of the above; etc.), monopropellant (e.g., hydroxylammonium nitrate (HAN), ammonium dinitramide (ADN), hydrazinium nitroformate (HNF), etc.), and/or any other suitable material. The propellant can be EMI-BF4 (1-ethyl-3-methylimidazolium tetrafluoroborate); EMI-IM (1-ethyl-3-methylimidazolium bis (trifluoromethylsulfonyl)imide); EMI-BTI (1-ethyl-3-methylimidazolium bis(pentafluoroethyl)sulfonylimide); EMI-TMS (1-ethyl-3-methylimidazolium trifluoromethanesulfonate); EMI-$GaCl_4$ (1-ethyl-3-methylimidazolium tetrachlorogallate); BMP-BTI (1-butyl-1-methylpyrrolidinium bis (trifluoromethylsulfonyl)imide); HMI-HFP (1-hexyl-3-methylimidazolium hexafluorophosphate); EMIF.2.3HF (1-ethyl-3-methylimidazolium fluorohydrogenate); EMI-CF3BF3 (1-ethyl-3-methylimidazolium trifluoromethyltrifluoroborate); EMI-$N(CN)_2$ (1-ethyl-3-methylimidazolium dicyanamide), EMI-PF6 (1-ethyl-3-methylimidazolium hexafluorophosphate); EMI-$C(CN)_3$ (1-ethyl-3-methylimidazolium tricyanomethanide); BMI-$FeBr_4$ (1-butyl-3-methylimidazolium iron tetrabromide); BMI-$FeCl_4$ (1-butyl-3-methylimidazolium iron tetrachloride); $C_6$MI-$FeBr_4$ (1-hexyl-3-methylimidazolium iron tetrabromide); $C_6$MI-$FeCl_4$ (1-hexyl-3-methylimidazolium iron tetrachloride); EMI-DCA (1-ethyl-3-methylimidazolium dicyanamide); BMI-I (1-butyl-3-methylimidazolium iodide); $C_5$MI—$(C_2F_5)_3PF_3$ (1-methyl-3-pentylimidazolium tris(pentafluoroethyl) trifluorophosphate); MOI-TFB (11-ethyl-3-octylimidazolium tetrafluoroborate); any ionic liquid containing an imidazolium, N-alkyl-pyridinium, tetraalkyl-ammonium, tetraalkyl-phosphonium, and/or other suitable cations; any ionic liquid containing hexafluorophosphate, tetrafluoroborate, acetate, trifluoroacetate, bromine, chlorine, iodine, nitrate, trifluorosulfonate, bis(trifluoromethylsulfonyl) imide, tetraalkylborate, heptachlorodialuminate, and/or any other suitable anion; and/or any other suitable ionic liquid.

In variants, the system can have a propellant impedance (e.g., fluid impedance) that depends on the emitter parameters and propellant characteristics (e.g., temperature, pressure, vapor pressure, viscoelastic properties such as viscosity, interaction energy between propellant and emitter material, etc.); however, additionally or alternatively, the fluid impedance can be independent of the emitter parameters, independent of the propellant characteristics, can depend on the substrate (e.g., substrate thickness, material, etc.), can be independent of the substrate, and/or the propellant impedance can be determined in any suitable manner. The fluid impedance is preferably analogous to the resistance in an electrical circuit (e.g., flow resistance, a measure of the resistance to the flow of the fluid, etc.); however, the fluid impedance can include the electrical resistance of the fluid, the resistance to conduction/flow of specific ionic species through the fluid (e.g., anion, cation, etc.), and/or can be otherwise suitably defined. The fluid impedance can be 10-100 kPa s/L, 0.1-1 MPa s/L, 0.1-10 MPa s/L, and/or any other suitable value or range thereof. The fluid impedance can be the same for each emitter in the emitter array, be different for one or more emitters in the emitter array (e.g., in a controlled manner such as a radial, linear, etc. gradient in fluid impedance; as a result of the machining process; with variations in emitter characteristic; etc.), be different for one or more emitter arrays, and/or the emitter(s) can have any suitable fluid impedance. In a specific example, the fluid impedance is constant with respect to the aspect ratio of the emitter(s) (e.g., ratio of the emitter height to base, ratio of the emitter height to the apex radius of curvature, etc.). In a second example, the impedance is constant with respect to the ratio of an emitter dimension relative to a substrate dimension (e.g., emitter dimension to substrate thickness). However, the fluid impedance can be otherwise determined.

In variants including one or more reservoirs, the reservoir preferably functions to store propellant; however, the reservoir can perform any suitable functions. The reservoir is preferably coupled to one or more emitter arrays (e.g., directly, through the substrate, through manifolds, through absorption, through adsorption, etc.) and stores the propellant; however, the reservoir can be part of the substrate, and/or can be suitably arranged. The reservoir can optionally include a valve (e.g., to control the propellant flow rate, quantity of propellant flowed, etc.). The reservoir material can be any suitable emitter material, any combination of one or more emitter materials, and/or any suitable material. The reservoir material can be the same as or different from the emitter material. The reservoir can store a volume of propellant including 1 μl, 10 μl, 100 μl, 1 ml, 10 ml, 100 ml, 1 l, etc. In variants including more than one reservoir, the separate reservoirs can store the same propellants (e.g., provide redundancy) and/or store different propellants. In a specific example, the reservoir defines a container adjacent to the substrate. In this example, the reservoir is coupled to the emitter array via a manifold 135.

In a specific example, a thruster chip can include two reservoirs. The two reservoirs are preferably electrically isolated from one another. In this specific example, each reservoir is coupled to (e.g., in fluid communication with) an independent set of emitters and/or emitter arrays. However, the reservoirs can be coupled to overlapping sets of emitters and/or emitter arrays, the same emitters and/or emitter arrays, and/or any emitters and/or emitter arrays. However, the thruster chip can include one reservoir, more than two reservoirs (e.g., a reservoir associated with each emitter array), and/or any suitable number of reservoirs.

In variants, the reservoir may include and/or be electrically coupled to a distal electrode 138, which functions to apply (e.g., cooperatively with the counter electrode) an electric field to the working material. The distal electrode can be a wall of the reservoir, patterned onto a wall of the reservoir, suspended within the reservoir, and/or otherwise arranged. However, the distal electrode can be part of the substrate (e.g., a surface of the substrate distal the emitter array, a surface of the substrate proximal the emitter array, etc.), part of the emitters and/or emitter array, or otherwise arranged. The distal electrode is preferably electrically contacted to the power supply, but can be electrically contacted to the control system, the emitter array, the substrate, and/or any element. The distal electrode is preferably held at the electrical potential generated by the power supply, but can be held at a reference potential, grounded, and/or held at any electrical potential. When the distal electrode is at a potential, the working material is preferably also at the same potential. However, the working material can be at a lower electrical potential, a higher electrical potential, and/or experience any suitable electrical potential.

In variants including a control system 140, the control system functions to control the operation of the emitter array. The control system is preferably coupled to the reservoir and the emitter array; however, the control system can be configured in any suitable manner. In a specific example, the control system is coupled to the valve of the reservoir allowing the control system to modify the operation state of the system. In this example, the control system can close the valve to stop and/or decrease the emission of the propellant, the control system can open the valve to start and/or increase the emission of the propellant, and/or the control system can perform any suitable function. The control system is preferably local (e.g., connected to the emitter array, connected to the reservoir, etc.); however, additionally or alternatively the control system can be remote (e.g., in communication with the emitter array, in communication with the reservoir, etc.), can be distributed (e.g., have local and remote components), and/or be otherwise suitably located. In a specific example, the control system can be a microprocessor programmed to automatically control emitter array operation; however, the microprocessor can be programed to act in response to an operator input, to request operator input based on the emitter array operation, and/or be programmed in any suitable manner. In another specific example, the control system can be a remote operator device (e.g., smart phone, computer, etc.) in communication with the emitter array.

The control system can include communication module(s). The communication module(s) can include long-range communication modules (e.g., supporting long-range wireless protocols), short-range communication modules (e.g., supporting short-range wireless protocols), and/or any other suitable communication modules. The communication modules can include cellular radios (e.g., broadband cellular network radios), such as radios operable to communicate using 3G, 4G, and/or 5G technology, Wi-Fi radios, Bluetooth (e.g., BTLE) radios, NFC modules (e.g., active NFC, passive NFC), Zigbee radios, Z-wave radios, Thread radios, wired communication modules (e.g., wired interfaces such as USB interfaces), and/or any other suitable communication modules.

The control system can control a single array, a subset of emitters within an array, a single emitter, a set of arrays, a single reservoir, more than one reservoir, and/or any other suitable components. In variants including more than one control system, the multiple control systems can each control an overlapping set of emitters, a nonoverlapping set of emitters, the same set of emitters, the same reservoir, different reservoirs, different sets of reservoirs, and/or any other suitable division of control.

The control system can optionally be in communication with a thermal element (e.g., thermoelectric, resistive heating element, refrigerant, friction, Peltier device, etc.). The thermal element can be adjacent to the reservoir, adjacent to one or more emitters, in thermal contact with one or more emitters, in thermal contact with one or more emitter arrays, and/or otherwise suitably arranged. In specific variants, the control system can change the operation state of the thermal element to change the temperature of the propellant, of the emitter, of the system, and/or of any set/subset of components.

The control system can include one or more sensors to monitor the operation parameters (e.g., temperature of operation, pressure of operation, propellant stream properties, propellant flow rate, propellant flow quantities, etc.).

The control system can optionally be in communication with a pressure element (e.g., piston, spring, counterweight, vacuum, etc.) adjacent to the reservoir. The control system can change the operation state of the pressure element to change the pressure (e.g., vapor pressure, hydraulic pressure, etc.) of the propellant. The control system can include one or more sensors to monitor the operation parameters.

The control system can change which emitters (e.g., within an array) receive propellant. In this example, the propellant can be sent to the emitters in the center of the array at the start, then sent to emitters on the edge(s) of the array once flow has been established in the center of the array. In this example, the control system can change the relative amounts of propellant that can be sent to the individual emitters. However, the control system can take any suitable action to meet target operation parameters.

The control system can additionally or alternatively function to modify the electrical signal (e.g., the voltage, the current, slew rate, etc.) that is provided to each emitter and/or each emitter array. The control system can provide instructions to, modify a resistance, modify a capacitance, modify an induction, and/or otherwise change the power supply and/or the coupling between the power supply and the working material (and/or emitter array, counter electrode, reservoir, distal electrode, etc.). The electrical signal (e.g., electrical potential, current, voltage, slew rate, etc.) can depend on the emitter geometry, the density of emitters within the emitter array, the separation distance between emitters, the emitter material, the working material, target operation parameters (e.g., a target thrust, target impulse, etc.), working material volume, and/or any emitter parameter or other parameter. In a specific example, the current per each emitter (and/or emitter array) can be 10 fA, 100 fA, 1 pA, 10 pA, 100 pA, 1 nA, 10 nA, 100 nA, 1 μA, 10 μA, 100 μA, 1 mA, 10 fA-40 nA, 3 nA-200 nA, 300 nA-400 nA, 100-1000 nA, less than 10 fA, greater than 1 mA, and/or can be any suitable current. In a second specific example, the slew rate is preferably at most about 100 V/s, but can be greater than 100 V/s. In a third specific example, the slew rate can be nonlinear such as greater than 100 V/s when the voltage is below a threshold voltage and less than 100 V/s when the voltage is greater than or equal to the threshold voltage. However, the slew rate can be parabolic, exponential, linear, multilinear, super exponential, and/or have any functional form.

Figure 10:
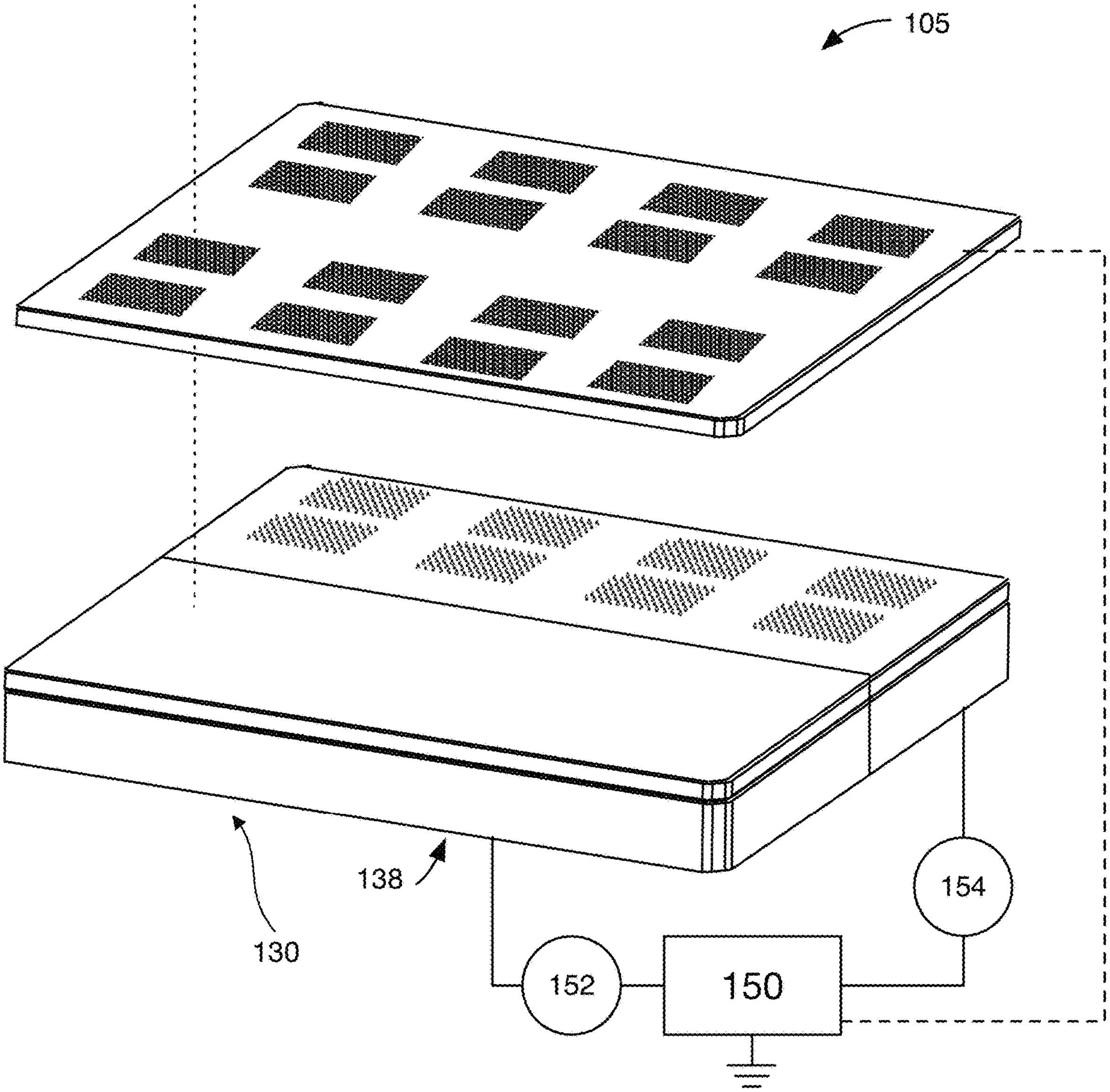
FIG. 10 is a schematic representation of an example of an ion propulsion system.

The optional power supply 150 preferably functions to generate one or more electric signals (e.g., electric potentials, current, etc.). The electric signal(s) are preferably direct current, but can be alternating current, pulsating current, variable current, transient currents, and/or any current. The power supply can be in electrical communication with the emitter array, the substrate, the working material, the reservoir, the distal electrode, the counter electrode, an external system (e.g., satellite such as small satellites, micro-satellites, nanosatellites, picosatellites, femto satellites, CubeSats, etc.), an electrical ground, and/or any suitable component. The power supply preferably generates large electric potentials such as at least 500V, 1 kV, 1.5 kV, 2 kV, 3 kV, 4 kV, 5 kV, 10 kV, 20 kV, 50 kV. However, the power supply can generate electric potentials less than 500 V and/or any suitable electric potential. The electric potentials can depend on the working material, the emitter material, emitter separation distance, emitter geometry, emitter parameters, emitter array properties, and/or any suitable properties. The power supply is preferably able to output either polarity electric potential (e.g., positive polarity, negative polarity), but can output a single polarity. In a specific example as shown in FIG. 10, the power supply is able to simultaneously (e.g., concurrently), contemporaneously (e.g., within a predetermined time such as 1 ns, 10 ns, 100 ns, 1 μs, 10 μs, 100 μs, 1 ms, 10 ms, 100 ms, 1 s, 10 s, 1 ns-10 μs, 1 μs-100 μs, 100 μs-10 ms, 1 ms-1 s, etc.), serially, or otherwise output a first (polarity) electric potential 152 (e.g., to working material associated with a first subset of emitters, to working material associated with a first subset of emitter arrays, to a first distal electrode, to a first reservoir, etc.) and a second (polarity) electric potential 154 (e.g., to working material associated with a second subset of emitters, to working material associated with a second subset of emitter arrays, to a second distal electrode, to a second reservoir, etc.). However, the power supply can switch polarity, the thruster chip can include more than one power supply (e.g., one power supply associated with each emitter array, two or more power supplies associated with each emitter array, one power supply associated with each subset of emitter arrays, etc.) and/or the power supply(ies) can be otherwise arranged.

In a specific example, the power supply can be the same as any power supply as described in U.S. patent application Ser. No. 16/385,709 titled "SYSTEM AND METHOD FOR POWER CONVERSION" filed 16 Apr. 2019, which is incorporated herein in its entirety by this reference. However, any power supply can be used.

The optional counter electrode preferably functions to generate an electric field to produce an electrospray. The counter electrode is preferably arranged opposing the emitter array across a gap (e.g., an air gap, a vacuum gap, a space environment gap, etc.), however, the counter electrode can be in contact with the emitter array, oppose the emitter array across a dielectric material (e.g., including pathways for working fluid emission), and/or can be otherwise arranged. The gap can define a distance that is less than 1 μm, 1 μm, 10 μm, 50 μm, 100 μm, 200 μm, 500 μm, 1 mm, 2 mm, 3 mm, 5 mm, 10 mm, 1 μm-500 μm, 250 μm-5 mm, greater than 10 mm, and or any suitable distance. The counter electrode can be electrically coupled to the power supply, the substrate, the reservoir, the external system, the control system, and/or to any element. The counter electrode preferably does not electrically contact working material (e.g., to prevent damage), but may incidentally or intentionally electrically contact working material. The counter electrode can include one or more electrically conductive, semiconductive, and/or nonconductive materials (e.g., made of tungsten, gold-titanium-coated silicon, etc.). In a specific example, the counter electrode can include a coating (e.g., a nonconductive coating) that covers any suitable surface area between 0-100% of the counter electrode.

Figure 9A:
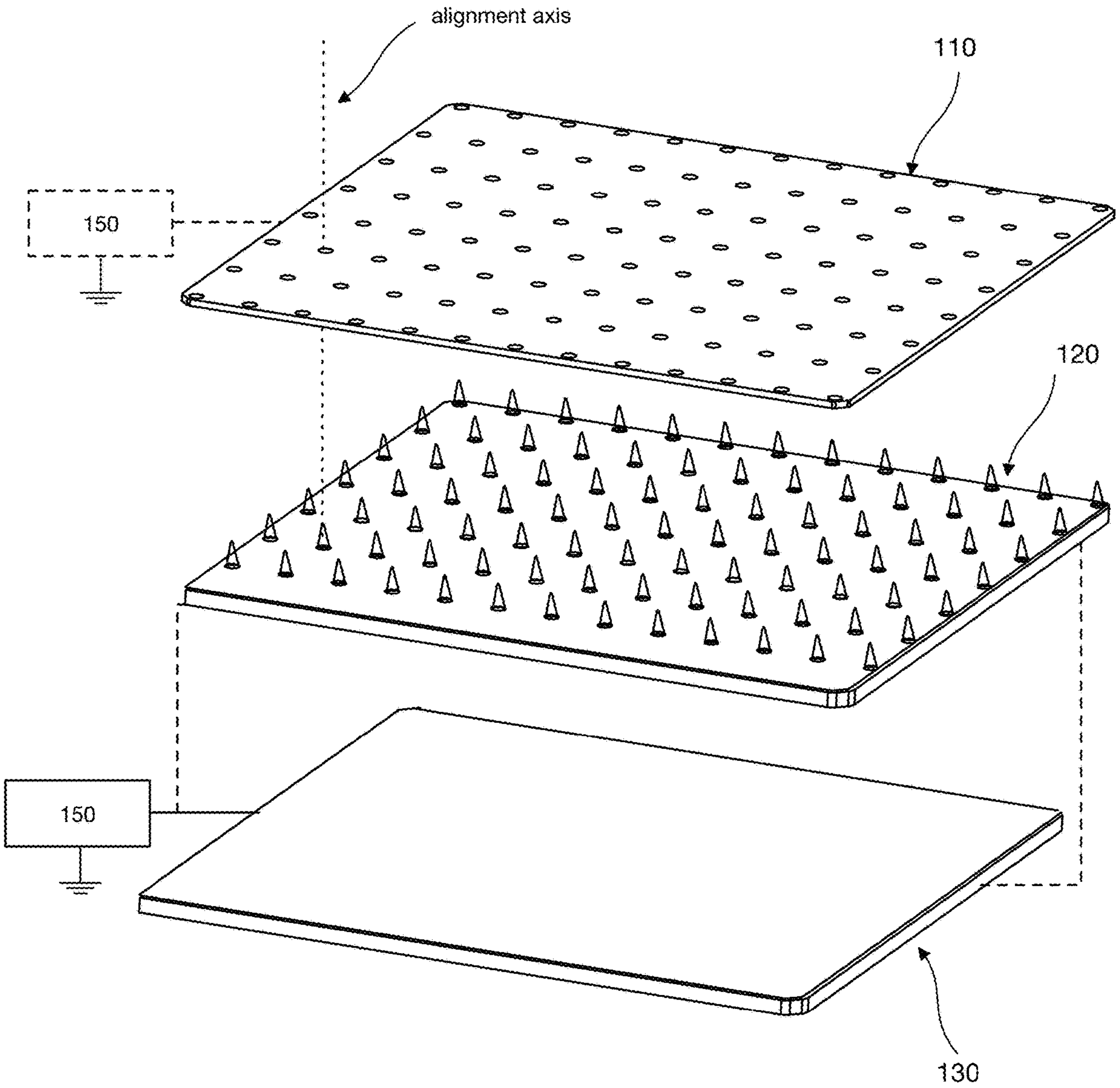
FIGS. 9A, 9B, and 9C are schematic representations of examples of emitter arrays aligned to apertures of counter electrodes.
Figure 9B:
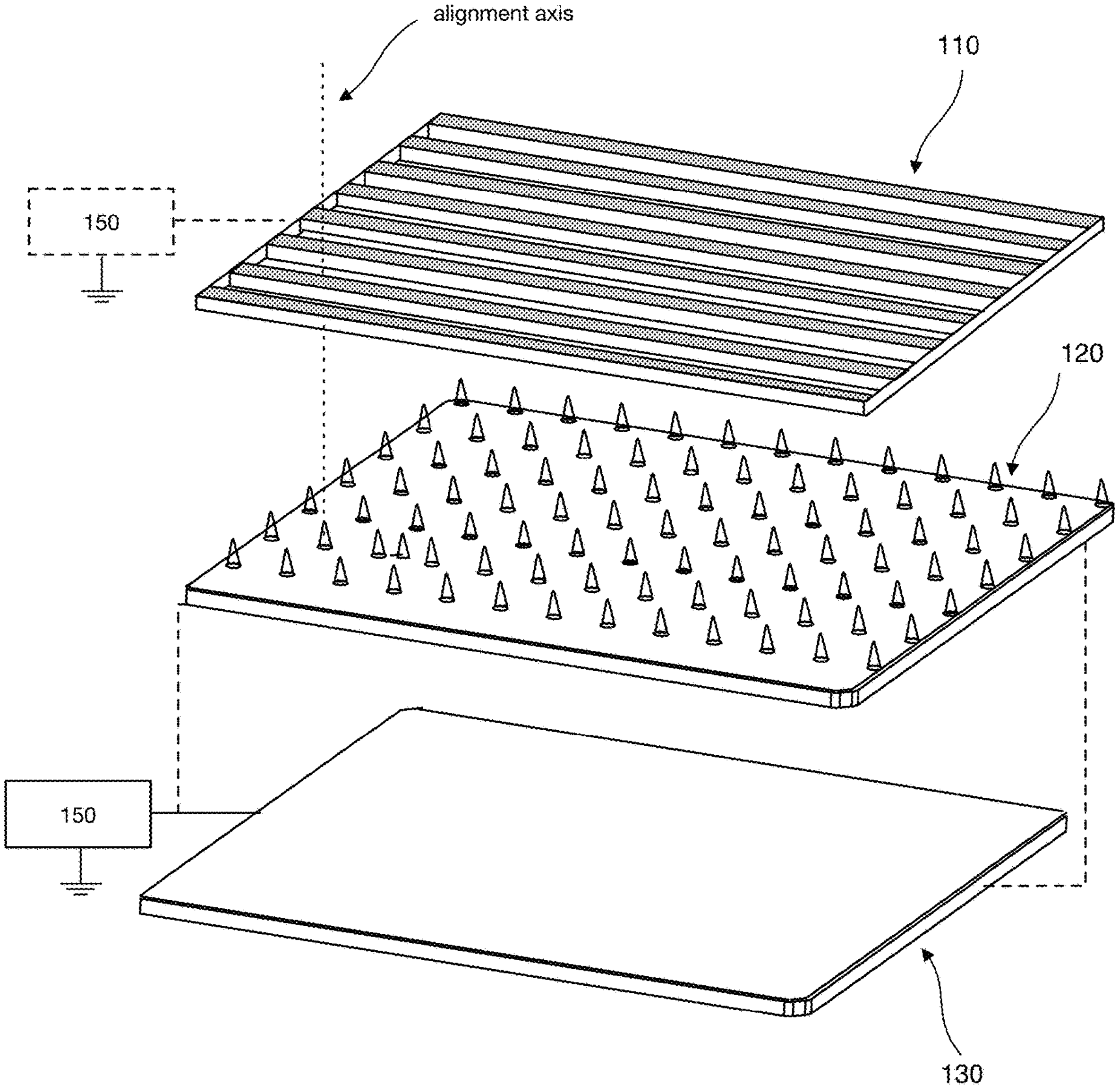
Figure 9C:
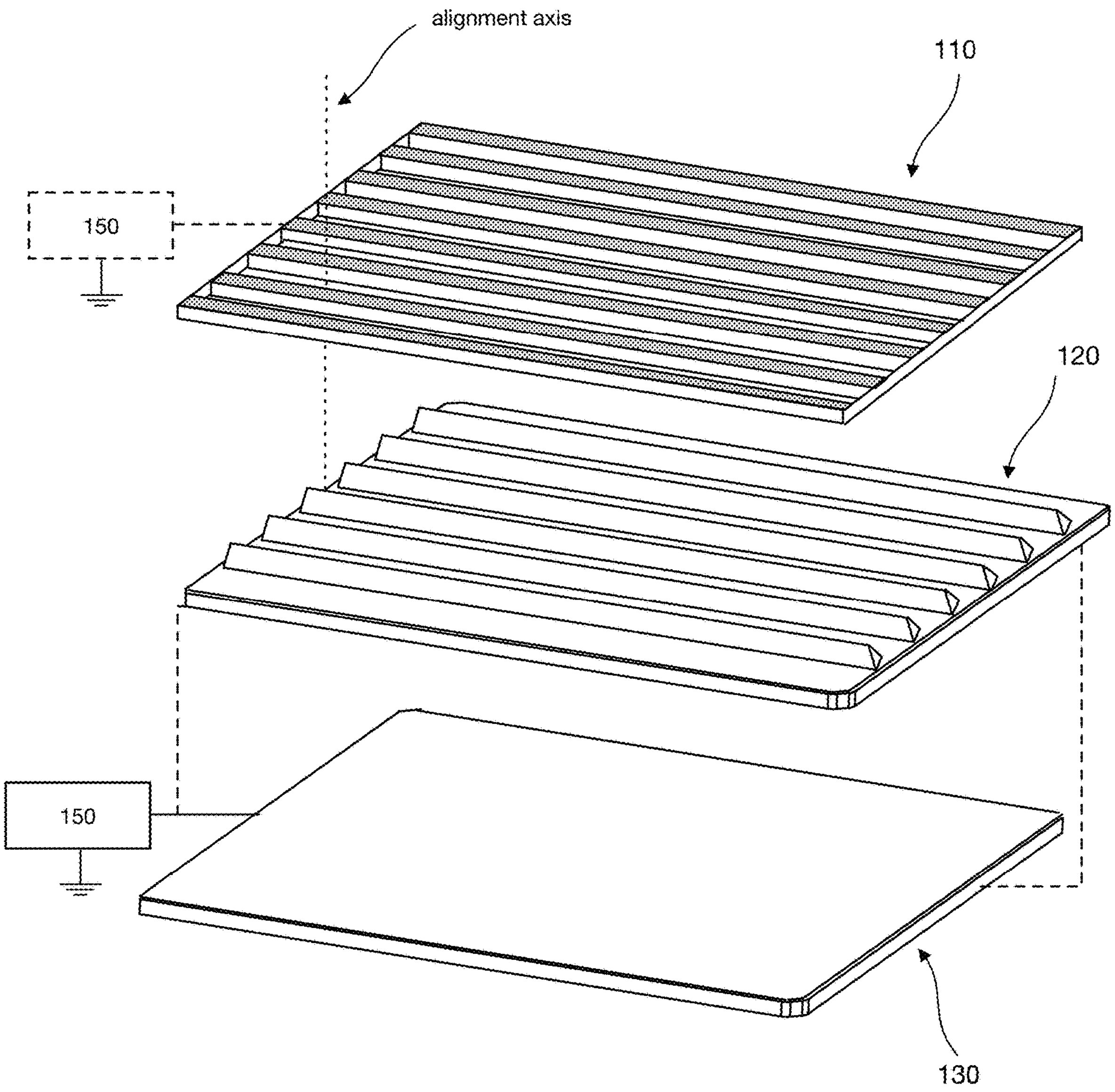

The emitter array is preferably aligned with (e.g., matches) a set of apertures defined by the counter electrode (e.g., each emitter positions is aligned to coincide with a counter electrode aperture, a plurality of emitters is aligned to coincide with a counter electrode aperture, as shown in FIGS. 9A-9C, etc.) but can be arranged in any suitable manner. The counter electrode apertures can be circular, polygonal (e.g., square, rectangular, hexagonal, etc.), linear, oblong, elliptical, oval, oviform, and/or have any suitable shape. Additionally or alternatively the counter electrodes can be bars (e.g., extending parallel to, between, or otherwise arranged relative to the corresponding emitters), rings (e.g., concentric with the corresponding emitter), and/or have any other suitable geometry. Each counter electrode aperture can correspond to (e.g., be aligned to) one or more emitters.

4. Method of Manufacture.

The method of manufacture preferably functions to manufacture the apparatus. The method of manufacture preferably includes preprocessing the emitter material, forming the emitter array, and postprocessing the emitter array; however, the method of manufacture can include any suitable steps.

Preprocessing the emitter material preferably functions to prepare the emitter material for forming an emitter array. Preparing the emitter array can include forming pores, increasing the uniformity of the pores, cleaning the emitter material (e.g., to remove debris, contaminants, etc. from the emitter material), modify the emitter material surface energy (e.g., wetting characteristics), create preferred material addition and/or removal sites, and/or otherwise prepare the emitter material. Preprocessing the emitter material is preferably performed before forming the emitter array, but can be performed at the same time as forming the emitter array. The emitter material is preferably preprocessed uniformly (e.g., in the same manner across the emitter material), but can be preprocessed nonuniformly. Preprocessing the emitter material can include: rinsing the emitter material (e.g., water; organic solvents such as alcohols, ethers, esters, ketones, aldehydes, etc.; acids such as hydrofluoric acid, hydrochloric acid, hydrobromic acid, hydroiodic acid, nitric acid, sulfuric acid, etc.; base such as lithium hydroxide solution, sodium hydroxide solutions, potassium hydroxide solution, rubidium hydroxide solution, etc.; inorganic solvent such as ammonia; surfactants; etc.), etching the emitter material, heating the emitter material, irradiating the emitter material (e.g., ionizing radiation, non-ionizing radiation, UV irradiation, x-ray irradiation, gamma irradiation, infrared irradiation, etc.), treating the emitter material (e.g., using plasma, reactive gas, nonreactive gas, reactive vapour, liquid chemical, etc.), sintering the emitter material, depositing material, removing material, and/or any processing steps.

Forming the emitter array preferably functions to convert a piece of emitter material (e.g., substrate) into an emitter array (e.g., as described above); however, forming the emitter array can perform any suitable function. Forming the emitter array preferably occurs before postprocessing the emitter array; however, forming the emitter array can occur simultaneously with and/or after postprocessing the emitter array. Forming the emitter array can include molding, milling, wet etching, using an ion beam, lithography, chemically etching, electrochemical etching, mechanically etching, electrical discharge machining, casting, vacuum forming, vapor depositing, laser machining, 3D printing (e.g., metals, polymers, electrons), electrodepositing, etc. a piece of emitter material into the emitter array. Forming the emitter array can be a multistep process (e.g., repeating the same step multiple times, performing one or more distinct steps, etc.)

or a single step process (e.g., only a single step needs to be performed). Forming the emitter array can form one or more arrays of emitter arrays on a substrate. In a specific example, forming the emitter array can include forming multiple arrays before postprocessing any of the emitter arrays. In another specific example, forming the emitter array can include creating an emitter array, postprocessing the emitter array, then creating further emitter arrays.

Postprocessing the emitter array preferably functions to improve the quality of the emitter array (e.g., remove one or more defects, sharpen the apex of one or more emitters, decrease the radius of curvature for one or more apices, prepare one or more guard emitters, convert one or more emitters into guard emitters, etc.) and ensure the emitter array is ready for operation; however, postprocessing the emitter array can perform any suitable function. Postprocessing the emitter array preferably occurs after forming the emitter array; however, postprocessing the emitter array can occur simultaneously with forming the emitter array, iteratively with forming the emitter array (e.g., an emitter array is formed, then processed, then another emitter array is formed; an emitter array is partially formed, then processed, then further forming steps are performed; etc.). Postprocessing the emitter array can include: annealing, polishing (e.g., mechanically, chemically, etc.), degassing, figuring (e.g., ion figuring), implanting ions, cleaning, coating, deposition of material, activating the surface (e.g., surface bonds, surface energies, etc.), passivating the surface (e.g., surface bonds, surface energies, etc.), fining the emitter array and/or emitter material, preprocessing steps (e.g., as described above), and/or any suitable steps. Postprocessing the emitter array can be a multistep process (e.g., repeating the same step multiple times, performing one or more distinct steps, etc.) or a single step process (e.g., only a single step needs to be performed).

The method of manufacture preferably uses emitter material (e.g., substrates); however, the method of manufacture can include producing the emitter material. The method of manufacture is preferably controlled such that the material properties are not changed during the method of manufacture (e.g., the energy input into the material is below a threshold, the temperature of the substrate does not exceed a target temperature such as a material melting temperature, etc.). However, the method of manufacture can additionally or alternatively include modifying the material properties such as producing pores in the material (e.g., drilling, implanting ions, etc.). In a specific example, during post-processing treatment, microstructures (e.g., pores) can be introduced into a graphite emitter array by implanting the graphite with silicon (e.g., silicon gas). However, the pores can be introduced in any suitable manner.

The term "substantially" as utilized herein can mean: exactly, approximately, within a predetermined threshold (e.g., within 1%, within 5%, within 10%, within 20%, within 25%, within 0-30%, etc.), predetermined tolerance, and/or have any other suitable meaning.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A satellite thruster chip apparatus comprising:

a first and a second emitter array, each comprising a plurality of substantially identical porous emitters, wherein each porous emitter of the plurality of substantially identical porous emitters has a concave lateral surface, wherein each porous emitter of the plurality of substantially identical porous emitters consists of silica, has a radius of curvature between about 4 and 6 μm, and comprises a substantially smooth surface; and a power supply configured to apply a first voltage to working material within the first emitter array and to contemporaneously apply a second voltage to working material within the second emitter array.

2. The satellite thruster chip apparatus of claim 1, wherein each emitter comprises an apex comprising a first radius of curvature along a first reference axis and a second radius of curvature along a second reference axis.

3. The satellite thruster chip apparatus of claim 1, wherein a pore size of each emitter of the first emitter array is between about 60 and 250 nm.

4. The satellite thruster chip apparatus of claim 1, wherein a height of each emitter of the first emitter array is between about 200 and 750 μm.

5. The satellite thruster chip apparatus of claim 1, wherein the plurality of emitters of the first emitter array are arranged in a hexagonal grid, wherein an apex to apex separation distance between emitters arranged in the hexagonal grid is between about 40 and 500 μm.

6. The satellite thruster chip apparatus of claim 1, wherein the working material comprises an ionic liquid; wherein the working material wets the emitters.

7. The satellite thruster chip apparatus of claim 1, wherein a variance of a pore size of the emitters of each emitter array is at most 30% of a mean pore size of the respective emitter array.

8. The satellite thruster chip apparatus of claim 1, wherein a variance of a radius of curvature of an apex of the emitters of each emitter array is at most 30% of a mean radius of curvature of the respective emitter array.

9. The satellite thruster chip apparatus of claim 1, wherein each emitter array comprises at least 0.5 emitters per square millimeter.

10. The satellite thruster chip apparatus of claim 1, wherein each emitter array comprises a dielectric material.

11. The satellite thruster chip apparatus of claim 1, wherein the first voltage and second voltage comprise the same magnitude and opposite polarity.

12. The satellite thruster chip apparatus of claim 2, wherein the first radius of curvature of the apex and the second radius of curvature of the apex are not the same.

* * * * *